(12) United States Patent
Nishii

(10) Patent No.: US 11,843,748 B2
(45) Date of Patent: Dec. 12, 2023

(54) IMAGE FORMING APPARATUS FOR ACQUIRING DESTINATION INFORMATION FROM A TERMINAL AND DISPLAYING THE INFORMATION ACCORDING TO A PRIORITY LEVEL

(71) Applicant: SHARP KABUSHIKI KAISHA, Sakai (JP)

(72) Inventor: Yuichi Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/703,498

(22) Filed: Mar. 24, 2022

(65) Prior Publication Data

US 2022/0321727 A1 Oct. 6, 2022

(30) Foreign Application Priority Data

Apr. 2, 2021 (JP) ................. 2021-063765

(51) Int. Cl.
*H04N 1/00* (2006.01)
*H04N 1/327* (2006.01)

(52) U.S. Cl.
CPC ..... *H04N 1/32793* (2013.01); *H04N 1/00129* (2013.01); *H04N 1/00177* (2013.01); *H04N 1/00915* (2013.01)

(58) Field of Classification Search
None
See application file for complete search history.

(56) References Cited

U.S. PATENT DOCUMENTS

| 9,652,623 | B2 * | 5/2017 | Asano | G06Q 10/10 |
| 2013/0070295 | A1 * | 3/2013 | Maruyama | H04N 1/00 358/1.15 |
| 2014/0126011 | A1 * | 5/2014 | Park | H04N 1/00106 358/1.15 |
| 2017/0374230 | A1 * | 12/2017 | Song | H04N 1/00408 |
| 2018/0278760 | A1 * | 9/2018 | Naito | H04N 1/00482 |
| 2018/0373576 | A1 * | 12/2018 | Yao | G06F 3/0481 |
| 2019/0132474 | A1 * | 5/2019 | del Rosario | H04N 1/00307 |
| 2019/0364159 | A1 * | 11/2019 | Saeda | H04N 1/346 |
| 2021/0021719 | A1 * | 1/2021 | Kobayashi | H04N 1/00238 |
| 2021/0173493 | A1 * | 6/2021 | Barzilay | G06F 3/0482 |
| 2021/0382883 | A1 * | 12/2021 | Itaya | G06F 16/2455 |

FOREIGN PATENT DOCUMENTS

JP 2019-062349 A 4/2019

* cited by examiner

*Primary Examiner* — Benjamin O Dulaney
(74) *Attorney, Agent, or Firm* — ScienBiziP, P.C.

(57) ABSTRACT

An information processing device includes a display, a communicator, and a controller, in which the controller acquires destination information managed by a terminal device via the communicator and displays the acquired destination information on the display in accordance with its priority level.

13 Claims, 27 Drawing Sheets

IMAGE FORMING APPARATUS FOR ACQUIRING DESTINATION INFORMATION FROM A TERMINAL AND DISPLAYING THE INFORMATION ACCORDING TO A PRIORITY LEVEL

BACKGROUND OF THE INVENTION

Field of the Invention

The present invention relates to an information processing device and the like.

Description of the Background Art

Information processing devices such as multifunction peripherals have a Scan to E-mail function that enables transmission of image data (hereinafter may simply be referred to as images), which is read and generated by a scanner, as attachments to e-mails, or a fax function for transmitting such images as fax images.

In sending e-mails or faxes, users can specify the destination from destination information (address book) managed by an information processing device to execute a job pertaining to the Scan to E-mail function or the fax function.

When a desired destination is not included in the destination information managed by the information processing device, or the information processing device installed in convenience stores, copy service providers, or the like is temporarily used to execute the job, it is recently practiced that the information managed by a mobile terminal device such as a smartphone, a tablet, or a mobile phone is temporarily forwarded to the information processing device. Users can send e-mails and faxes by specifying the destination using the destination information forwarded to the information processing device.

For example, Japanese Unexamined Patent Application Publication No. 2019-062349 discloses a technology for providing a dedicated application on the mobile terminal device side and specifying a destination on the application to forward the specified destination information to an information processing device. In the invention disclosed in Japanese Unexamined Patent Application Publication No. 2019-062349, when there is more than one destination to be forwarded among the destination information, the user selects the transmission mode or the destination.

However, the installation of a dedicated application on the mobile terminal device is required in the invention disclosed in Japanese Unexamined Patent Application Publication 2019-062349. In addition, when there is more than one destination to be forwarded in the destination information, the user needs to select each destination individually, which is time-consuming.

It is an object of the present disclosure to provide an information processing device and the like, which can easily forward destination information from a terminal device without installing a dedicated application on the terminal device, and can increase convenience of sending e-mails and faxes in accordance with the acquired destination information.

SUMMARY OF THE INVENTION

In order to solve the above problem, an information processing device according to the present disclosure includes a display, a communicator, and a controller, in which the controller acquires destination information managed by a terminal device via the communicator and displays the acquired destination information on the display according to a priority level.

An image forming apparatus according to the present disclosure includes an information processing device including a display, a communicator, and a controller, and an image former that forms an image on a recording medium based on input image data, in which the controller acquires destination information managed by a terminal device via the communicator and displays the acquired destination information on the display according to a priority level.

An information processing method according to the present disclosure includes establishing communication between an information processing device and a terminal device, acquiring destination information managed by the terminal device, and displaying the acquired destination information on a display according to its priority level.

Thus, it is possible to provide the information processing device and the like that can easily forward the destination information from the terminal device without installing a dedicated application on the terminal device, and can increase convenience of sending e-mails and faxes in accordance with the acquired destination information.

DESCRIPTION OF THE PREFERRED EMBODIMENTS

Embodiments of the present disclosure will be described below with reference to the accompanying drawings. In the present disclosure, a multifunction peripheral having a copy function, a scan function, a Scan to E-mail function, a fax function, and the like is described as an example form of an information processing device or an image forming apparatus including such an information processing device. The following embodiments are examples for explaining the present disclosure and are not intended to limit the technical scope of the present disclosure recited in the appended claims.

1. First Embodiment

1.1 Functional Configuration

Figure 1:
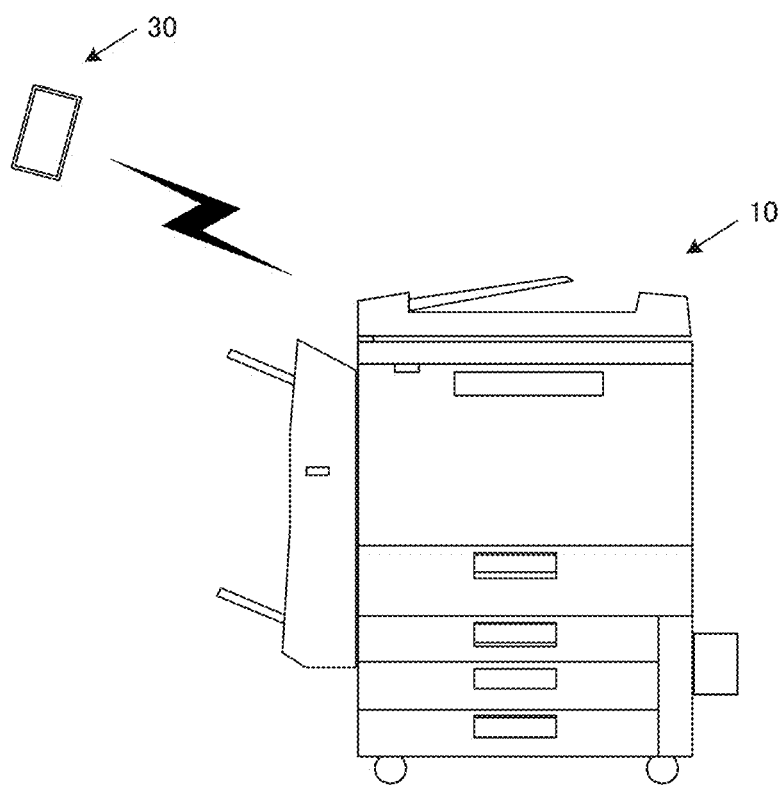
FIG. 1 is a front view illustrating an overall configuration of an information processing device according to a first embodiment.

FIG. 1 is a front view illustrating an overall configuration of a multifunction peripheral 10 according to a first embodiment. The multifunction peripheral 10 can communicate with a terminal device 30. There is no restriction in communication methods used, but the near field communication technologies such as Bluetooth (registered trademark), Wi-Fi (registered trademark), Wireless Smart Utility Network (Wi-SUN) (registered trademark), the infrared data association protocols (Irda), or the like can be adopted. In FIG. 1, the multifunction peripheral 10 is illustrated as an example to communicate directly with the terminal device 30, but it is also possible to establish communication via a network not illustrated, such as a local area network (LAN), a wide area network (WAN), or the Internet.

Figure 2:
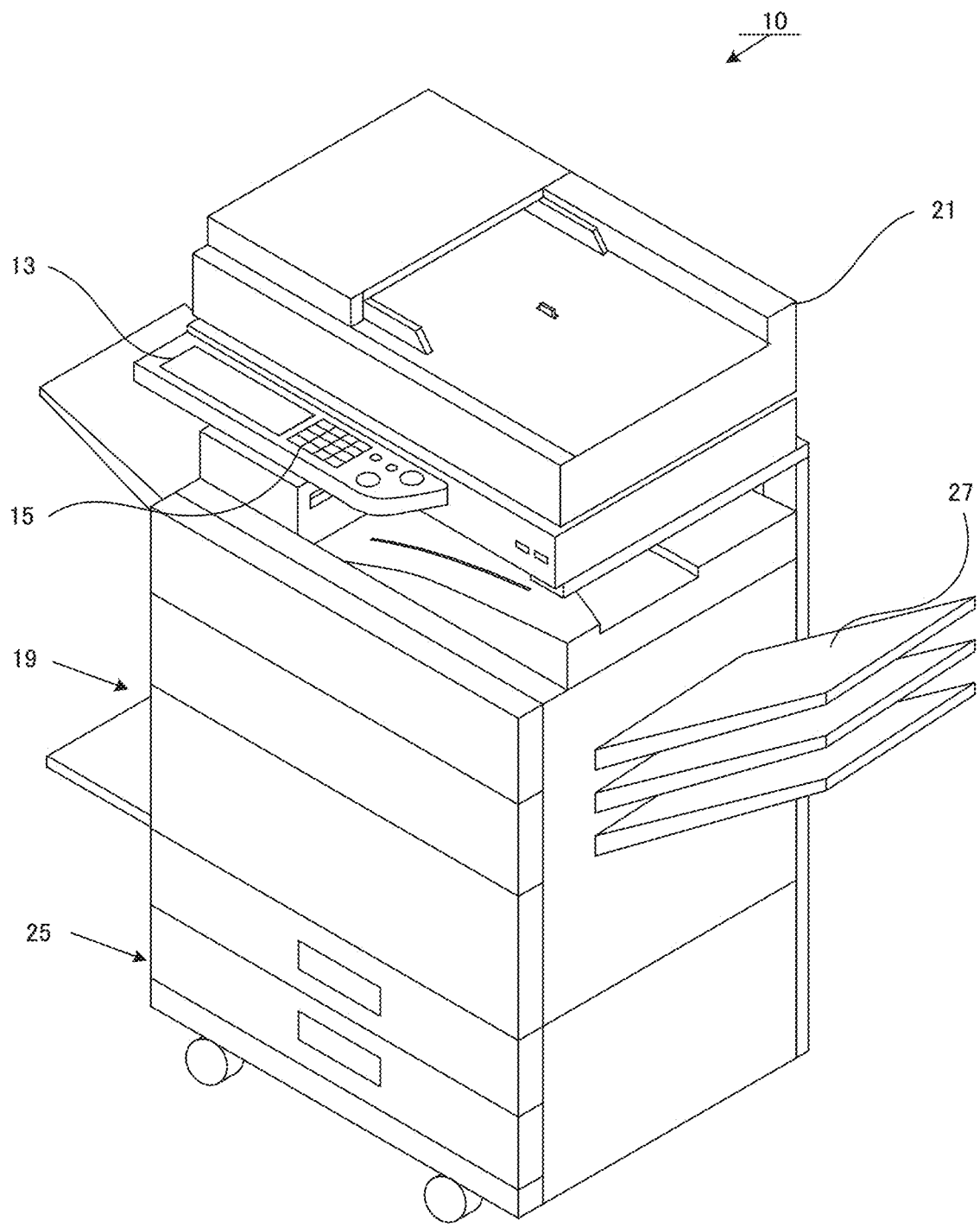
FIG. 2 is a perspective view illustrating an overall configuration of the information processing device according to the first embodiment.
Figure 3:
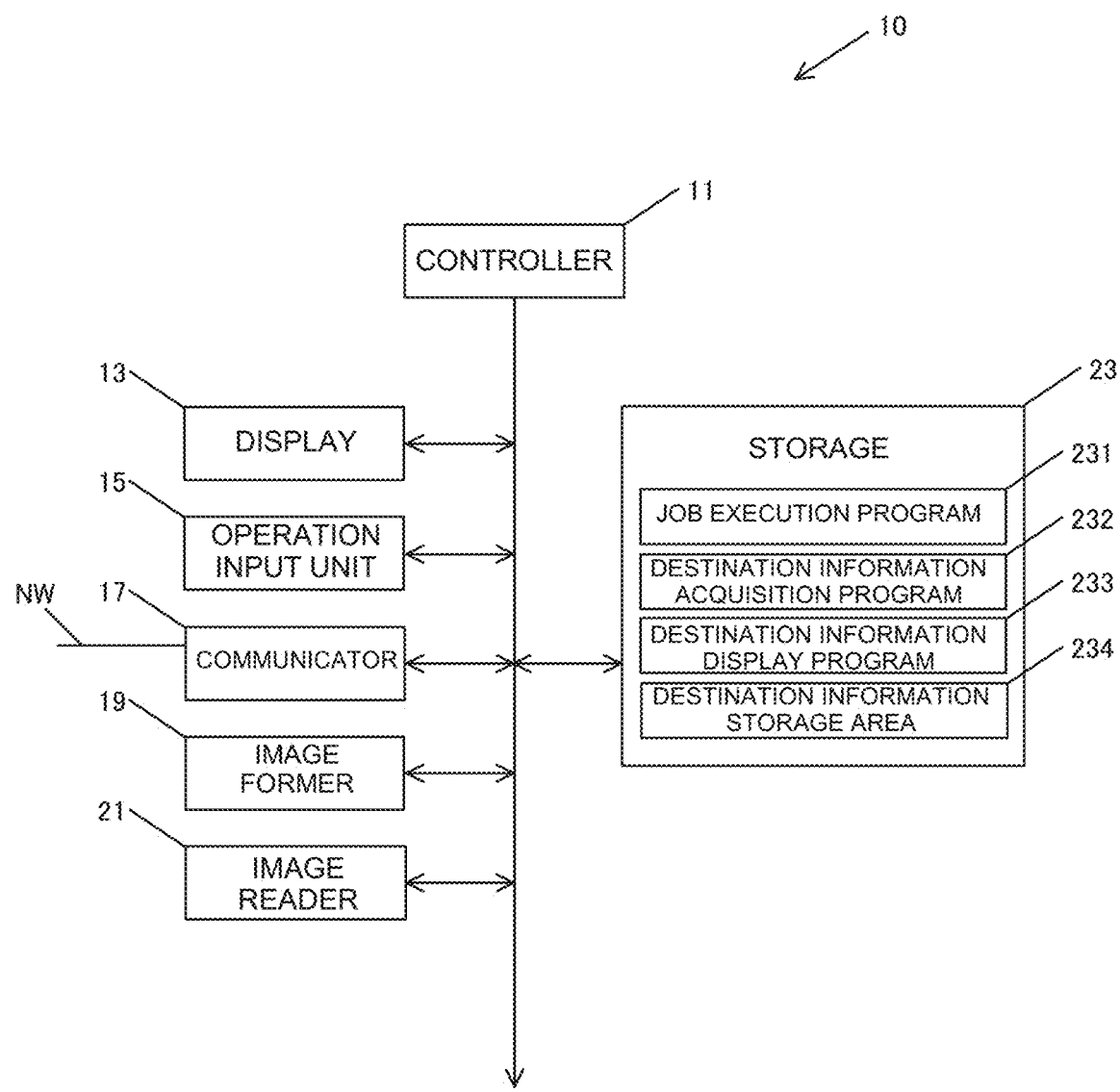
FIG. 3 illustrates a functional configuration of the information processing device according to the first embodiment.

FIG. 2 is a perspective view illustrating an overall configuration of the multifunction peripheral 10. FIG. 3 illustrates a functional configuration of the multifunction peripheral 10. The multifunction peripheral 10 includes a controller 11, a display 13, an operation input unit 15, a communicator 17, an image former 19, an image reader 21, and a storage 23.

The controller 11 controls the entire multifunction peripheral 10. The controller 11 is composed of one or more arithmetic devices (such as a central processing unit (CPU)). The controller 11 implements its functions by reading and executing various programs stored in the storage 23.

The display 13 displays various types of information to users or the like. The display 13 can be composed of, for example, a liquid crystal display (LCD) or an organic electro-luminescence (EL) display.

The operation input unit 15 accepts input information entered by users and others. The operation input unit 15 can be composed of hardware keys (for example, a numeric keypad), buttons, or the like. The operation input unit 15 can be provided as a touch panel that allows input via the display 13. In that case, the input on the touch panel may be detected using a resistive film, an infrared light, electromagnetic induction, capacitance, or the like.

The communicator 17 has an interface for the near field communication, as mentioned above, including Bluetooth, Wi-Fi, Wi-SUN, Irda, or the like. The communicator 17 can also have either or both wired/wireless interface to communicate with other devices via a network not illustrated, such as LAN, WAN, the Internet, telephone lines, fax lines, or the like.

The image former 19 forms images on paper, which is a recording medium, based on image data. The image former 19 feeds sheets of paper from a paper feeder 25, forms an image based on image data on the paper, and then discharges the paper from a paper discharge unit 27. The image former 19 can be composed of, for example, a laser printer using electrophotography. The image former 19 forms images using toner supplied from toner cartridges not illustrated corresponding to the toner colors (for example, cyan (C), magenta (M), yellow (Y), and black (K)).

An image reader 21 generates scan data by scanning and reading a document image to be read. The image reader 21 can be provided as a scanner device with an image sensor such as a charge coupled device (CCD), a contact image sensor (CIS), or the like. The image reader 21 can be in any configuration that allows reading the reflected light image from the document image with the image sensor and generates scan data consisting of RGB (R: red, G: green, B: blue) analog signals.

The storage 23 stores various programs and data necessary for the operation of the multifunction peripheral 10. The storage 23 may be composed of a storage device including, for example, a random access memory (RAM), a hard disk drive (HDD), a solid state drive (SSD), a read only memory (ROM), or the like.

In the first embodiment, the storage 23 stores a job execution program 231, a destination information acquisition program 232, and a destination information display program 233, and includes a destination information storage area 234.

The job execution program 231 is a program read by the controller 11 to perform processing associated with the execution of the copy function, the scan function, the Scan to E-mail function, the fax function, and the like on a job-by-job basis. The controller 11 reads the job execution program 231 and executes each job by controlling the communicator 17, the image former 19, the image reader 21, and the like.

The destination information acquisition program 232 is a program read by the controller 11 in acquiring the destination information managed by the terminal device 30. The controller 11, having read the destination information acquisition program 232, controls the communicator 17 and the like to communicate with the terminal device 30 and acquires the destination information managed by the terminal device 30. For example, when using Bluetooth (registered trademark) as the communication method, the controller 11 can follow a phone book access profile (PBAP) to collectively acquire the destination information managed by the terminal device 30 in a vCard format. The destination information according to the present disclosure refers to information for identifying destination of the communication, such as a telephone number, an e-mail address, a fax number, an account, and the like.

The destination information display program 233 is a program read by the controller 11 when the destination information acquired from the terminal device 30 is displayed on the display 13. The controller 11 sorts the destination information according to a priority level which will be described later, and displays the sorted destination information on the display 13.

The destination information storage area 234 is a storage area for storing the destination information acquired from the terminal device 30.

Figure 4:
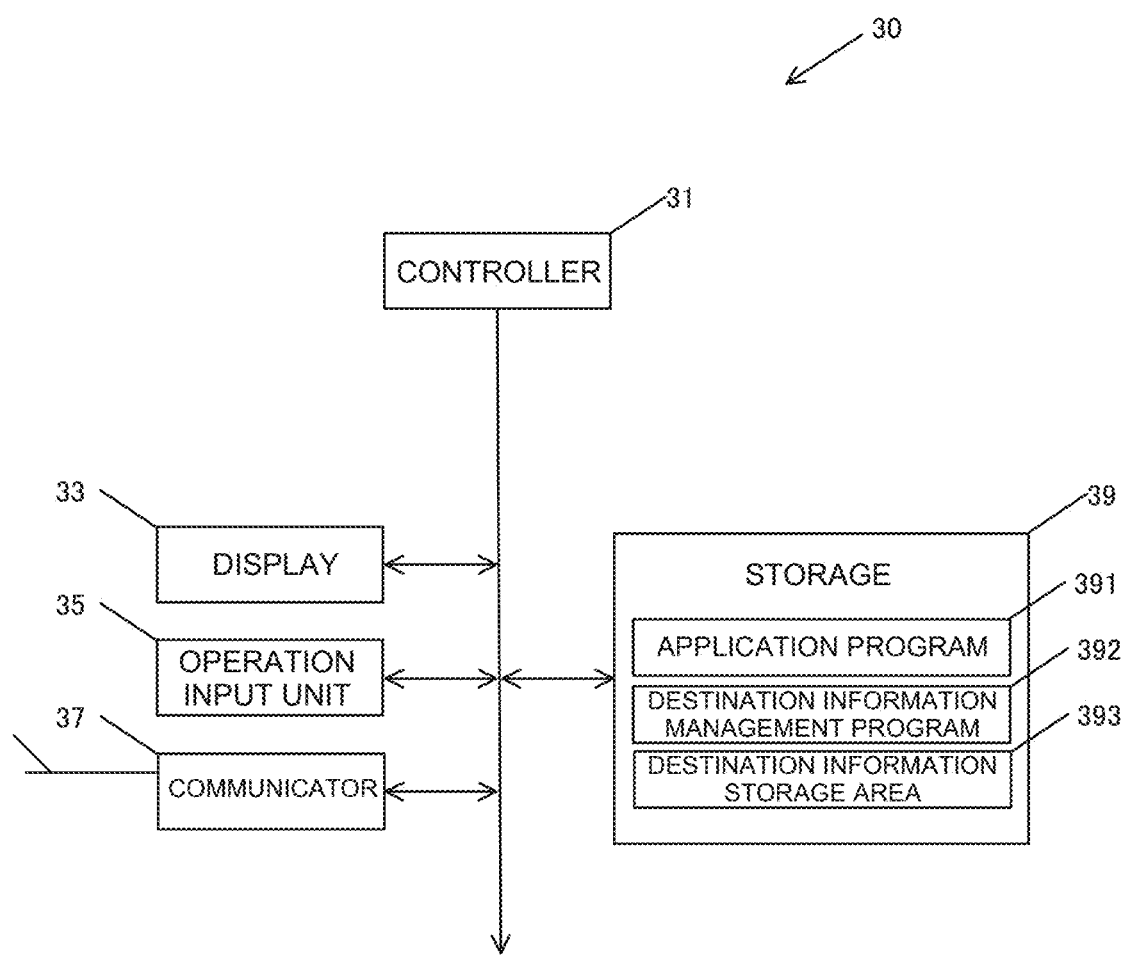
FIG. 4 illustrates a functional configuration of a terminal device according to the first embodiment.

FIG. 4 illustrates the functional configuration of the terminal device 30. The terminal device 30 according to the present disclosure is assumed to be a so-called mobile terminal device including, but not limited to, a smartphone, a tablet, a cell phone, a laptop, or the like. A mounted-type terminal device, such as a desktop computer, is also provided as the terminal device of the present disclosure when such a terminal device is in the environment capable of communicating with the multifunction peripheral 10.

The terminal device 30 as described above includes a controller 31, a display 33, an operation input unit 35, a communicator 37, and a storage 39.

The controller 31 controls the entire terminal device 30. The controller 31 is composed of, for example, one or more arithmetic devices (such as a CPU). The controller 31 implements its functions by reading and executing various programs stored in the storage 39.

The display 33 displays various information to the user. The display 33 can be composed of, for example, an LCD or an organic EL display.

The operation input unit 35 accepts input of information by the user or the like. The operation input unit 35 can be provided as of a touch panel that allows input via the display 33. In that case, the input on the touch panel may be detected using a resistive film, an infrared light, electromagnetic induction, capacitance, or the like.

The communicator 37 has an interface for the near field communication such as Bluetooth, Wi-Fi, Wi-SUN, Irda, or the like. The communicator 37 can also have either or both wired/wireless interface to communicate with other devices via a network not illustrated, such as LAN, WAN, the Internet, telephone lines, fax lines, or the like.

The storage 39 stores various programs and data necessary for the operation of the terminal device 30. The storage 39 may be composed of storage device including, for example, a RAM, an HDD, an SSD, a ROM, or the like.

In the first embodiment, the storage 39 stores an application program 391 and a destination information management program 392, and includes a destination information storage area 393.

The application program 391 is a program read by the controller 31 when executing various applications such as, for example, a phone call, an e-mail, a fax, social networking services (SNS), video and music viewing and listening, computer games, or the like.

The destination information management program 392 is a program read by the controller 31 when managing destination information such as a telephone number, an e-mail address, a fax number, and an account of the destination which are used in applications such as the phone call, the e-mail, the fax, the SNS, or the like. The controller 31 performs processing such as new registration, editing, and deletion of the destination information in accordance with an instruction from the user. In addition, the controller 31 reads and outputs the managed destination information in accordance with a request to acquire the destination information from the multifunction peripheral 10. When the request to acquire destination information is made in accordance with the PBAP, the controller 31 can write the destination information in the vCard format. The destination information can also be exported in a comma separated value (CSV) format. In that case, the controller 31 can export all the destination information and then transmit them collectively to the multifunction peripheral 10. The destination information management program 392 may be provided as a management program incorporated in the application program 391.

The destination information storage area 393 is a storage area for storing the destination information such as, for example, a telephone number, an e-mail address, a fax number, an account, and the like in association with identification information such as a user name, a user ID, an address, a company name, and the like.

1.2 Processing Flow

Figure 5:
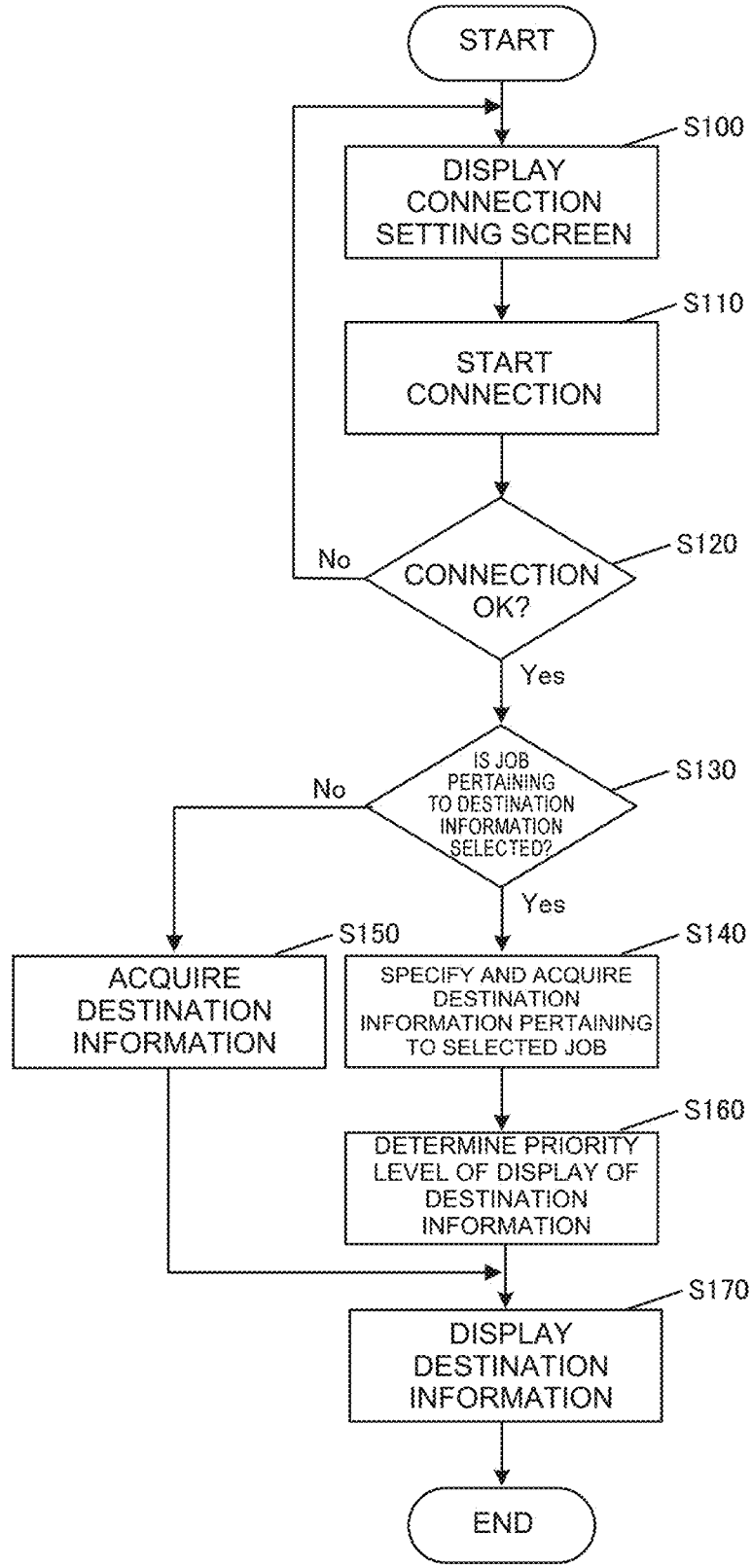
FIG. 5 is a flowchart explaining a processing flow according to the first embodiment.

Next, a processing flow according to the first embodiment is described by referring to FIG. 5. FIG. 5 illustrates an example form in which the destination information subject to priority display is specified by selecting the job type. This is explained below.

When the controller 11 of the multifunction peripheral 10 receives an instruction from the user to acquire the destination information managed by the terminal device 30, the controller 11 reads the destination information acquisition program 232 and displays a connection setting screen (step S100).

The controller 11 starts connection with the terminal device 30 (step S110), and determines whether the connection has been made normally (step S120). If the connection is successful (step S120; Yes), the controller 11 checks whether a job pertaining to the destination information has been selected (step S130).

If the job pertaining to the destination information is selected (step S130; Yes), the controller 11 specifies and acquires the destination information pertaining to the selected job (step S140).

Subsequently, the controller 11 determines a priority level (priority display level) pertaining to the display of the acquired destination information (step S160). Then, the controller 11 displays the destination information on the display 13 (step S170) and ends the process.

On the other hand, if the job pertaining to the destination information is not selected (step S130; No), the controller 11 acquires the destination information (step S150). Then, the controller 11 displays the destination information on the display 13 (step S170) and ends the process.

After executing the job, the controller 11 deletes the destination information displayed in step S170 from the destination information storage area 234.

1.3 Operation Example

Next, an operation example is described. This operation example describes an example form in which Bluetooth is used as the communication method with the terminal device 30.

1.3.1 Priority Display of Destination Information Acquired Via Home Screen (Basic Screen)

Figure 6:
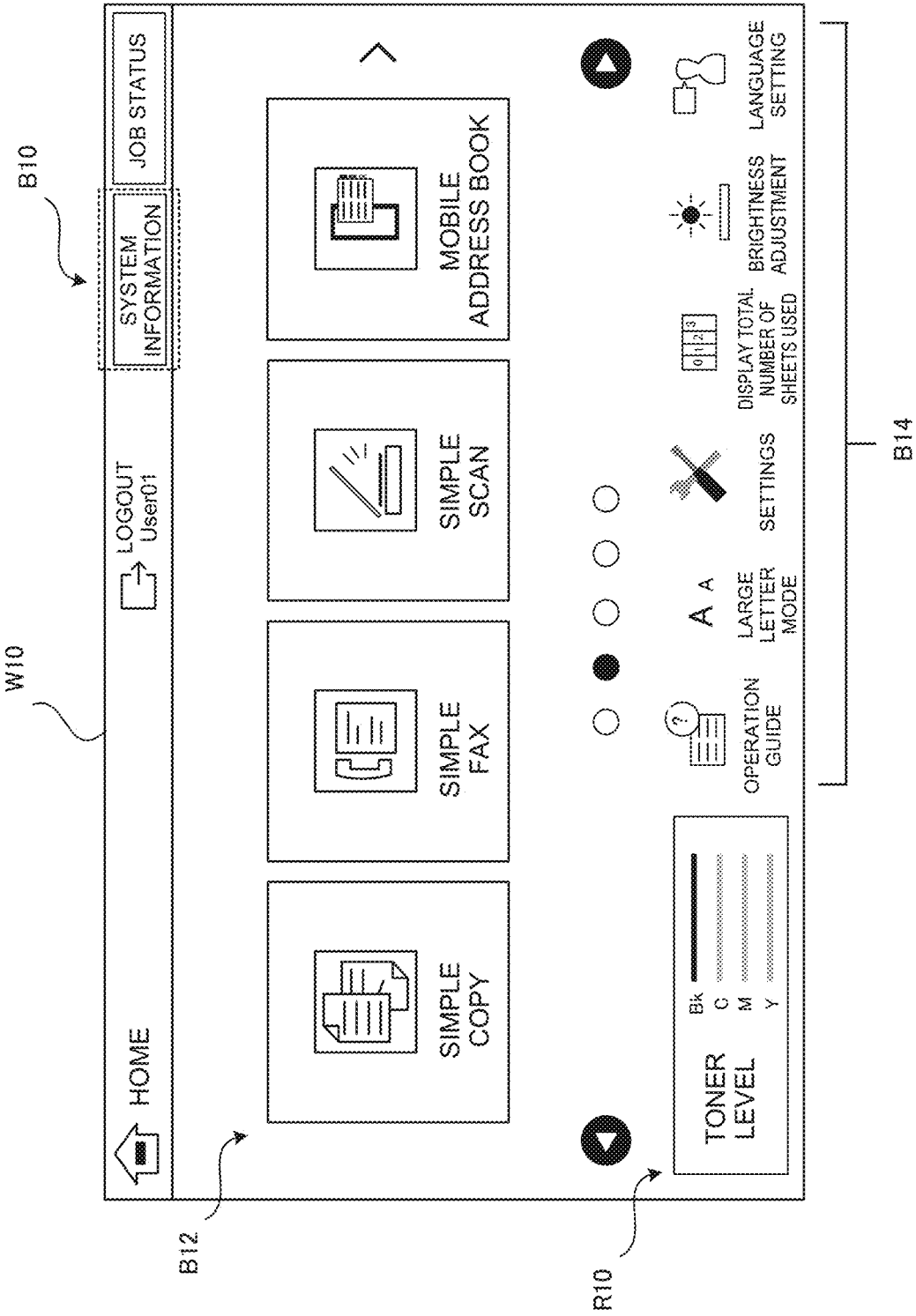
FIG. 6 is a view explaining an operation example of the first embodiment.

FIG. 6 illustrates an example of a home screen W10 of the multifunction peripheral 10. The home screen W10 is a basic screen that is displayed on the display 13 in cases like when the power is turned on, in standby mode, when recovering from sleep mode, and the like, and receives operation input from the user. The home screen W10 includes a system information button B10, transmission mode selection buttons B12, a device status display area R10, and function selection buttons B14.

The system information button B10 is a button that accepts the instruction for displaying the system information screen which will be described in connection with the subsequent drawing. When the user presses the system information button B10, the controller 11 displays a system information screen W20.

The transmission mode selection buttons B12 are buttons that accept a selection of the transmission mode. When one of the transmission mode selection buttons B12 is pressed, the controller 11 displays the setting screen for the corresponding transmission mode.

The device status display area R10 is an area for displaying the device status of the multifunction peripheral 10. In the example of FIG. 6, the toner level is displayed in the device status display area R10.

The function selection buttons B14 are buttons that accept a change instruction, a reference instruction, or the like pertaining to the function settings of the multifunction peripheral 10. When the function selection buttons B14 are pressed, the controller 11 displays a setting screen not illustrated of the corresponding function for executing the change instruction or the reference instruction.

Figure 7:
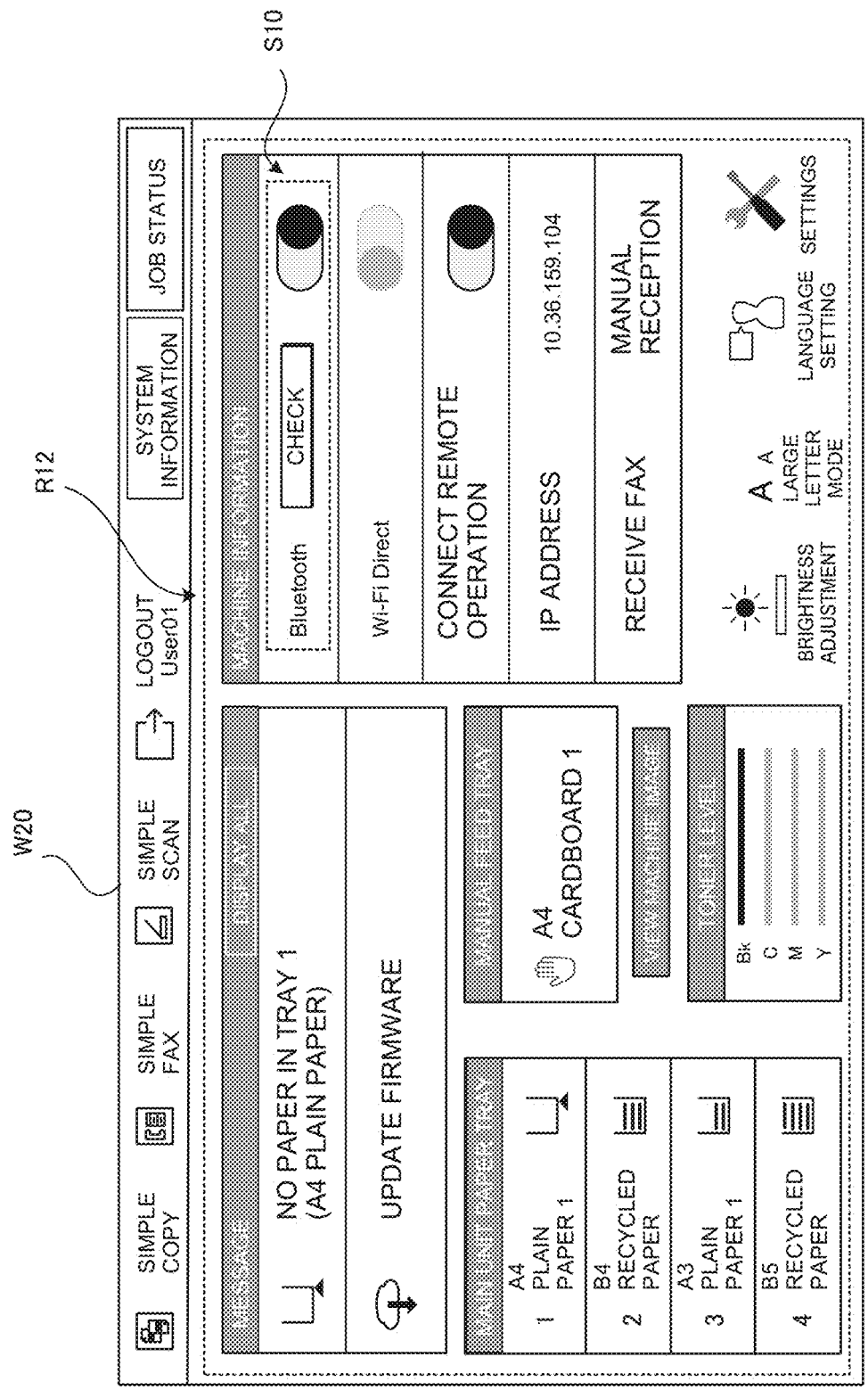
FIG. 7 is a view explaining an operation example of the first embodiment.

FIG. 7 illustrates an example of a system information screen W20 that is displayed by the controller 11 in response to pressing the system information button B10 of the home screen W10. The system information screen W20 is a screen that displays information about the system of the multifunction peripheral 10. The system information screen W20 includes an information display area R12 for displaying information including, for example, maintenance information of the device such as running out of paper or firmware updates, and machine information such as communication settings. To enable communication using Bluetooth, the user needs to set a slider S10 in the machine information section to an "ON" state to activate Bluetooth communication.

Figure 8:
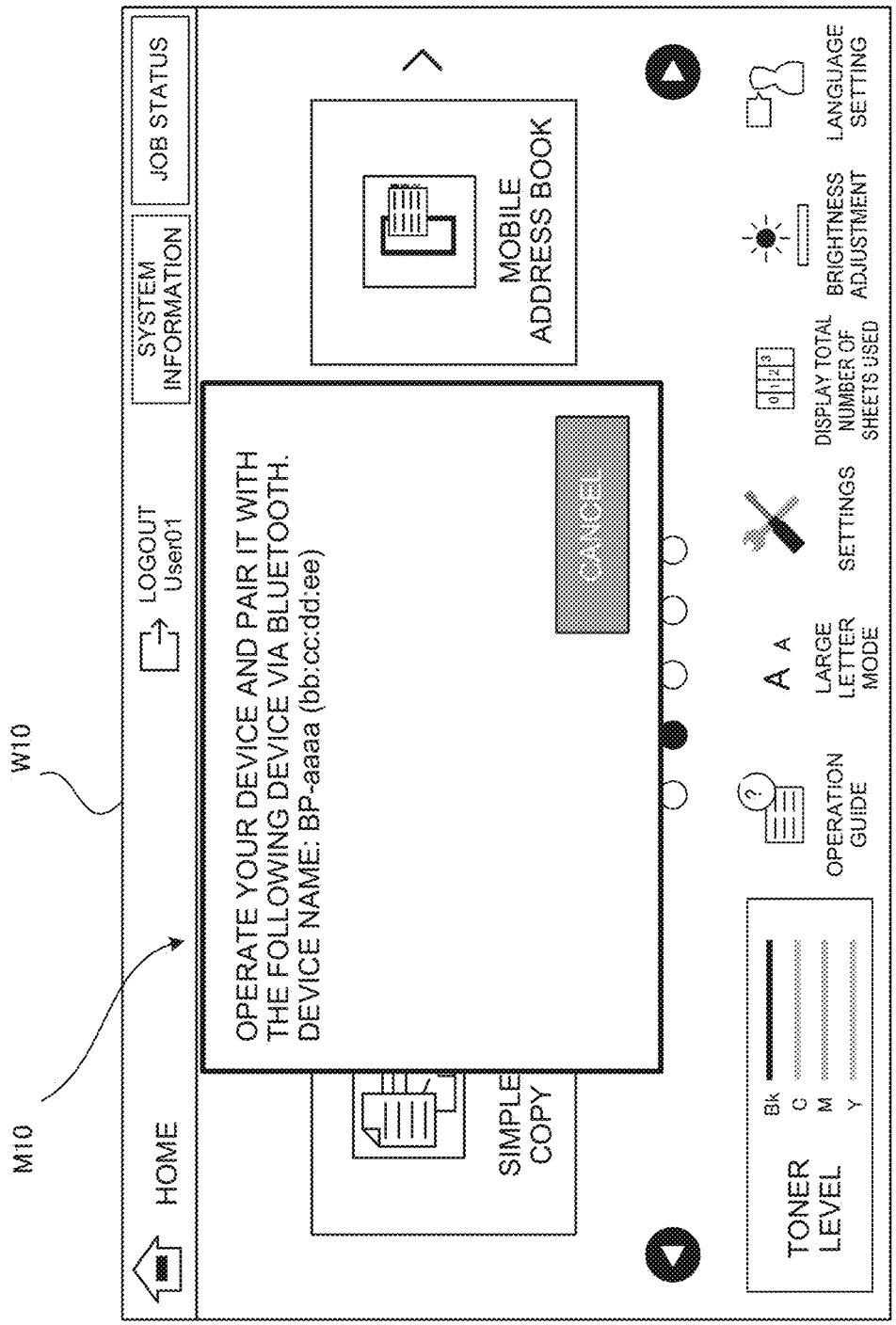
FIG. 8 is a view explaining an operation example of the first embodiment.

FIG. 8 illustrates an example of a message screen M10 that is displayed on the home screen W10 until the connection with the terminal device 30 is established (pairing) after the "Mobile Address Book" button of the transmission mode selection buttons B12 is pressed.

The message screen M10 can be a screen equivalent to a message screen usually displayed on the devices when trying to start connection using Bluetooth. That is, the message screen displays the name of the device to be connected (in the example of FIG. 8, the device name: BP-aaaa (bb:cc:dd:ee)). Although not illustrated in FIG. 8, a passkey (for example, pass key: 1234) for establishing a connection may also be displayed. The user can establish the connection by entering the passkey to permit connection to the device in question.

Figure 9:
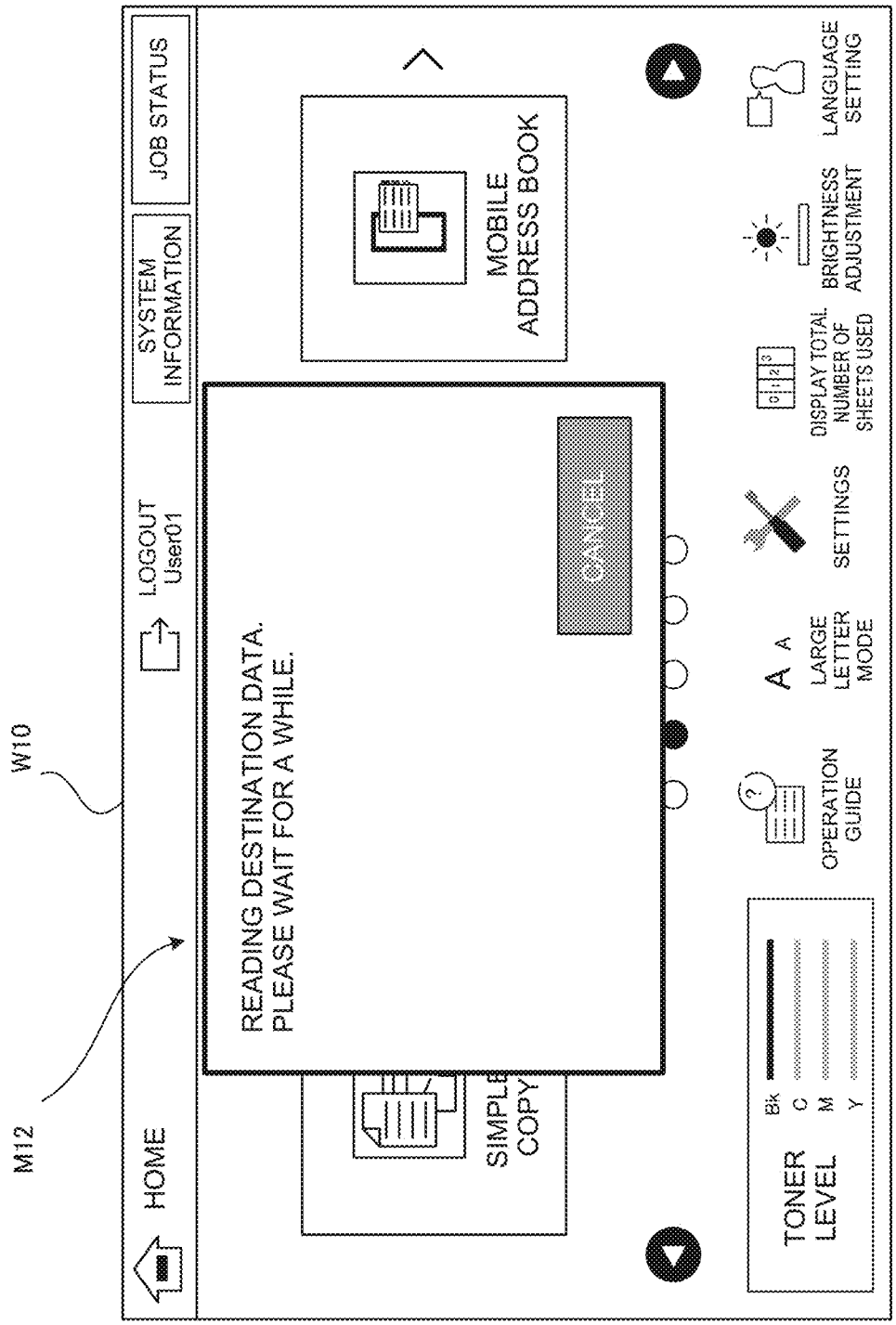
FIG. 9 is a view explaining an operation example of the first embodiment.

FIG. 9 illustrates an example of a message screen M12 that is displayed after the connection with the terminal device 30 is established. Once the connection with the terminal device 30 is established, the controller 11 starts forwarding the destination information. The message screen M12 displays a message to report the forwarding status of the destination information.

In a case in which the destination information contains the mark "@", the controller 11 recognizes it as an e-mail address in forwarding the destination information. When the destination information is only numeric, the controller 11 recognizes it as a fax number. Although the destination information is only numeric but contains a cell phone number (for example, "090" or "080" at the beginning), the controller 11 may exclude the destination information from forwarding.

After acquiring the destination information, the controller 11 determines the type of destination information which is most numerous in the acquired destination information. In other words, the controller 11 determines the display screen to be moved to, after acquiring the destination information, according to the number of e-mail addresses and fax numbers in the destination information forwarded from the terminal device 30 to the multifunction peripheral 10.

Figure 10:
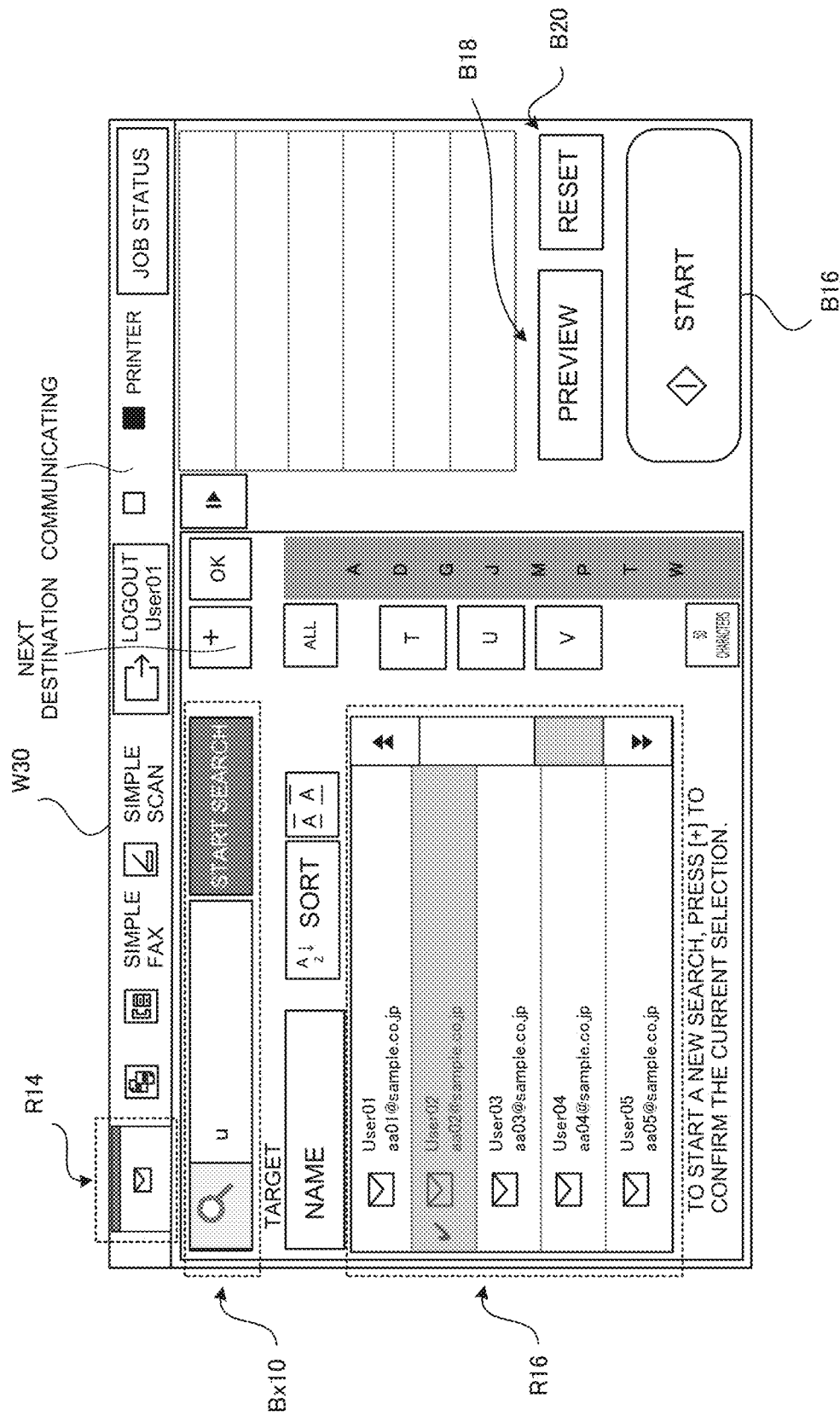
FIG. 10 is a view explaining an operation example of the first embodiment.

For example, if the type of destination information (job type) which is most numerous in the acquired destination information is e-mail transmission, the controller 11 displays the transmission mode setting screen for e-mail transmission as illustrated in FIG. 10.

FIG. 10 illustrates an example of a setting screen W30 of the transmission mode for sending e-mails. The setting screen W30 includes a mode display area R14, a search value input box Bx10, a destination information display area R16, a start button B16, a preview button B18, and a reset button B20.

The mode display area R14 is an area for displaying the selected transmission mode. The selected transmission mode may be highlighted with a bar at the top of an image representing the transmission mode (sending e-mails), as in the example of FIG. 10.

The search value input box Bx10 accepts the input of a search value to search for a desired e-mail address. For example, when the user enters the character "u" as the search value and presses the adjacent "Start Search" button, the destination information display area R16 displays search results.

The destination information display area R16 is an area for displaying the search results of the e-mail address search. FIG. 10 illustrates an example of the results of the search when the character "u" is entered into the search value input box Bx10 as the search value. In the example of FIG. 10, the e-mail address of "user02" is selected in the e-mail addresses displayed in the destination information display area R16.

The start button B16 is a button that accepts the instruction to execute sending the e-mail to the selected e-mail address.

The preview button B18 is a button that accepts, for example, the instruction of preview display of the image generated by the Scan to E-mail function. The reset button B20 is a button that accepts the instruction to reset the setting values or the like that are entered and selected via the setting screen W30 in the transmission mode.

Figure 11:
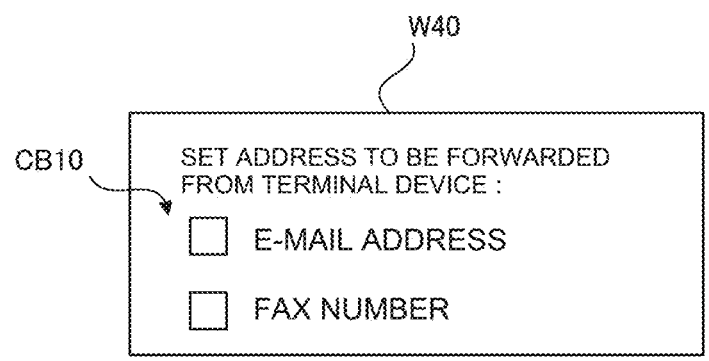
FIG. 11 is a view explaining an operation example of the first embodiment.

When acquiring the destination information by forwarding it from the terminal device 30, it is possible to set which destination information is to be acquired. FIG. 11 illustrates an example of a setting screen when the destination information to be forwarded from the terminal device 30 is set in accordance with the job type.

A setting screen W40 includes a destination information selection check box CB10 that accepts the selection of the destination information to be forwarded in accordance with the job type. The user selects the desired destination information to be forwarded by checking one or both of the "E-mail Address" and the "Fax Number" in the destination information selection check box CB10.

The controller 11 can specify the destination information to be forwarded from the terminal device 30 in accordance with the selection result of the destination information selection check box CB10.

1.3.2 Priority Display of Destination Information Acquired Via Address Book Screen of Basic Image Transmission Screen The basic image transmission screen can be called from the home screen described above. The basic image transmission screen has a screen structure that allows detailed settings for image transmission, unlike the simple setting screens for simple scan, simple fax, and the like, and allows images to be transmitted to a predetermined destination from the address book provided in the multifunction peripheral 10. The following explains how to acquire the address book of an external device via the basic image transmission screen.

Figure 12:
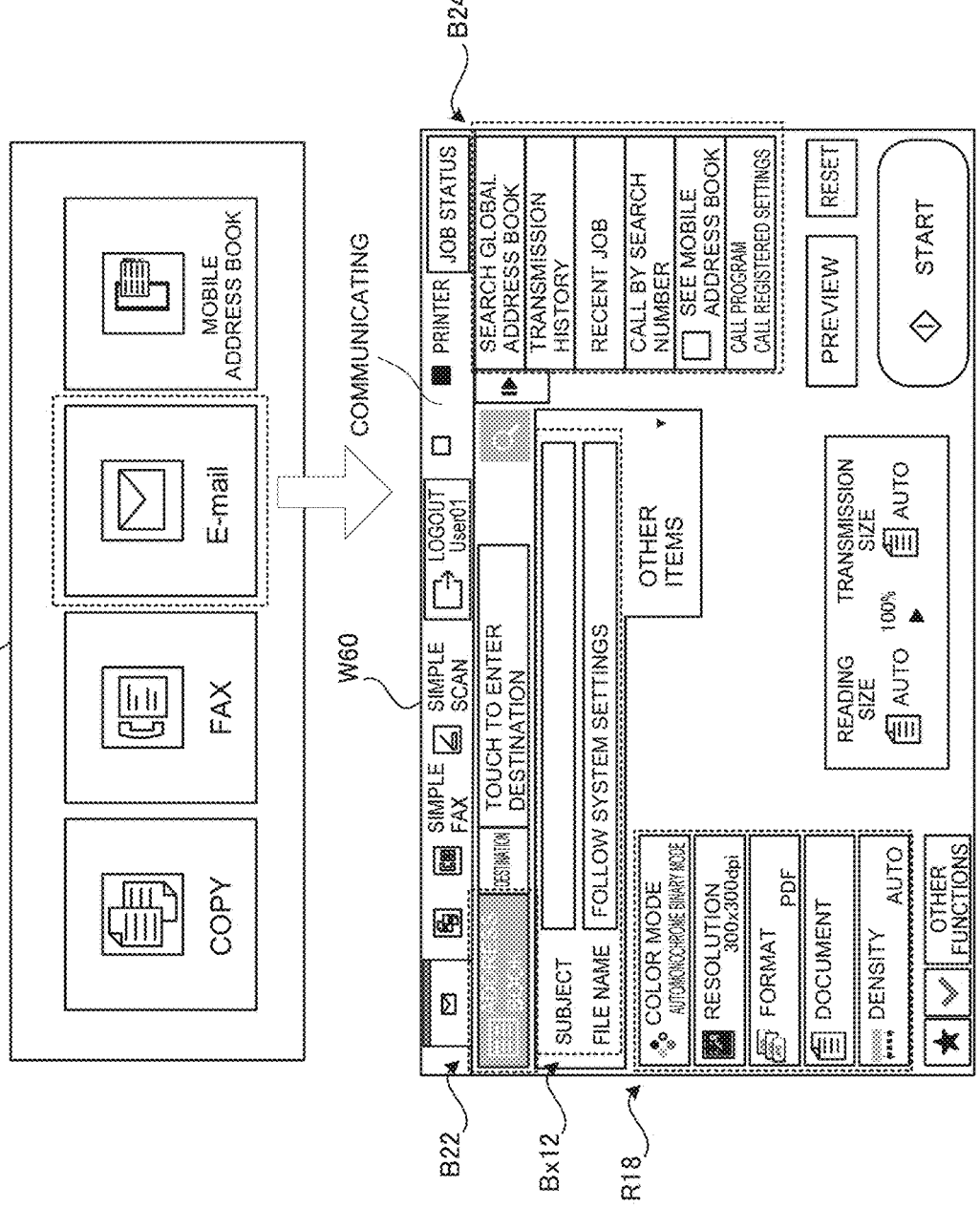
FIG. 12 is a view illustrating an operation example of the first embodiment.

FIG. 12 illustrates an operation example when calling a basic image transmission screen from the home screen W50. FIG. 12 illustrates a partial area of the home screen W50 centered on the transmission mode selection buttons B12.

When the user presses the "E-mail" button of the transmission mode selection buttons B12, the controller 11 displays a basic image transmission screen W60.

The basic image transmission screen W60 includes an address book button B22, a subject (file name) input box Bx12, a setting information display area R18, and processing selection buttons B24.

The address book button B22 accepts an input to instruct display of the address book (which will be explained in connection with the subsequent drawing) managed by the multifunction peripheral 10 itself. The user can transmit an image to the desired e-mail address by selecting it from the displayed address book. The selected e-mail address can be displayed in the adjacent destination box.

The subject (file name) input box Bx12 includes boxes that accept an input of the subject of the e-mail to be sent and an input of the file name of the image file to be attached to the e-mail.

The setting information display area R18 is an area in which the setting information for image transmission is displayed. In the setting information display area R18, the setting information stored in the storage 23 as setting history information may be read out and displayed.

The processing selection buttons B24 are buttons that accept the selection of desired processing (action) by the user. The processing selection buttons B24 accept the selection of various processing including "Search Global Address Book", "Transmission History", "Recent Job", "Call by Search Number", and "See Mobile Address Book". When the "See Mobile Address Book" is selected, the destination information is acquired from the terminal device 30 in the same way as when the "Mobile Address Book" button is pressed on the home screen W10. Then, according to the type (job type) of the destination information which is most numerous in the acquired destination information, the display screen to be moved to after acquiring the destination information is determined, and the determined display screen is displayed.

Figure 13:
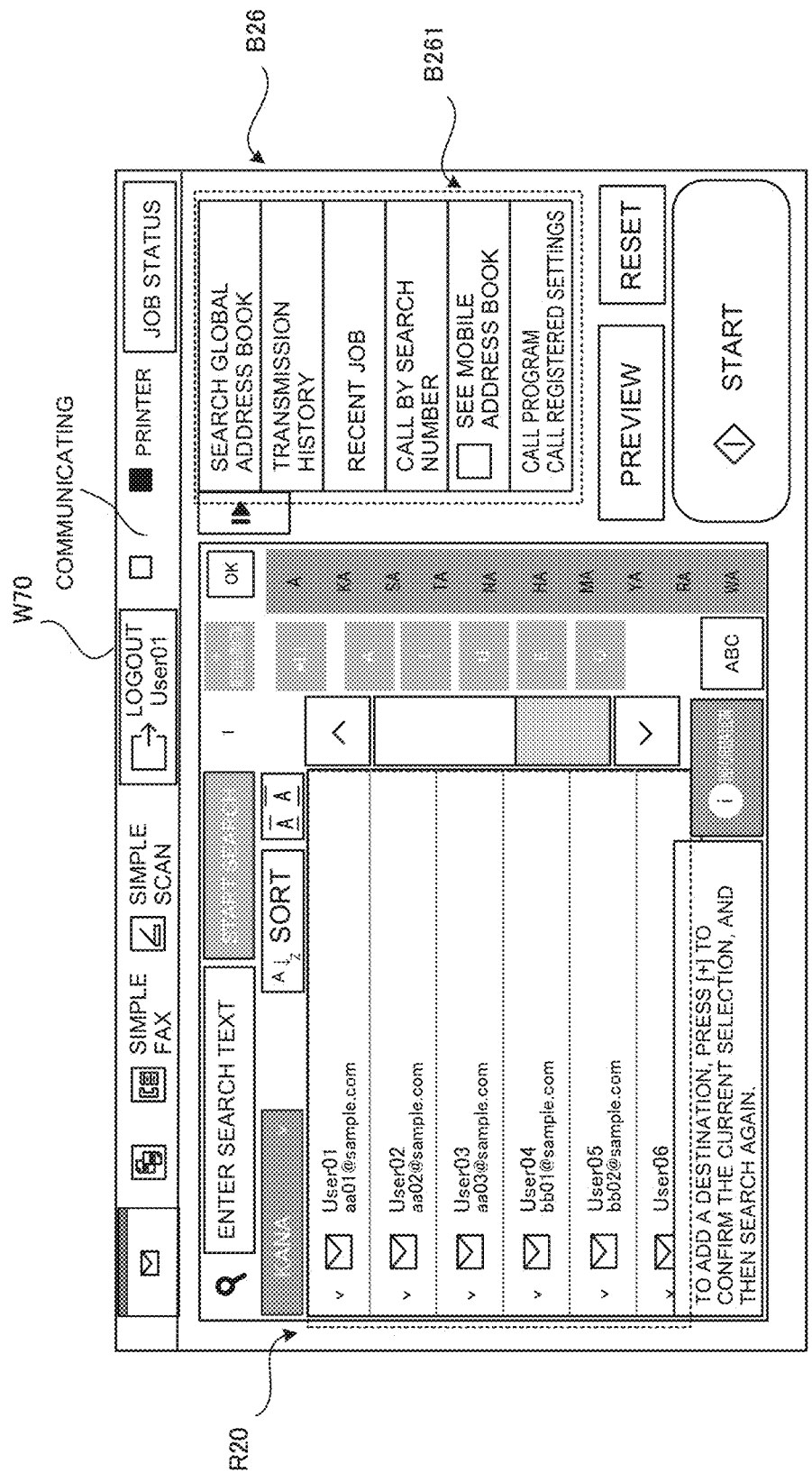
FIG. 13 is a view illustrating an operation example of the first embodiment.

FIG. 13 illustrates an example of an address book screen W70 displayed by the controller 11 in response to pressing the address book button B22 of the basic image transmission screen W60. The address book screen W70 is a screen in which the multifunction peripheral 10 displays the destination information managed by itself as an address book. The address book screen W70 includes a managed destination information display area R20 and processing selection buttons B26.

The managed destination information display area R20 is an area in which a list of destination information managed by the multifunction peripheral 10 is displayed.

The processing selection buttons B26 can be identical to the processing selection buttons B24 of the basic image transmission screen W60. When the user presses the "See Mobile Address Book" button B261, the controller 11 establishes the connection with the terminal device 30 and acquires the destination information managed by the terminal device 30. In that case, it may be possible to preferentially display the destination information which is most numerous among the destination information acquired from the terminal device 30.

Figure 14:
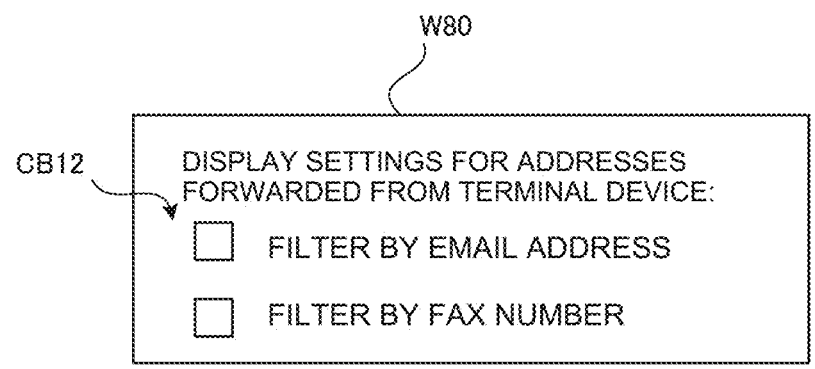
FIG. 14 is a view illustrating an operation example of the first embodiment.

After acquiring the destination information from the terminal device 30, it is possible to set which destination information is to be displayed. FIG. 14 illustrates an example of a setting screen for setting the display of the destination information forwarded from the terminal device 30.

A setting screen W80 includes a destination information filtering check box CB12 that accepts a display selection of the acquired destination information. The user filters the desired destination information to be displayed by checking one or both of the "Filter by E-mail Address" and the "Filter by Fax Number" in the destination information filtering check box CB12.

Figure 15:
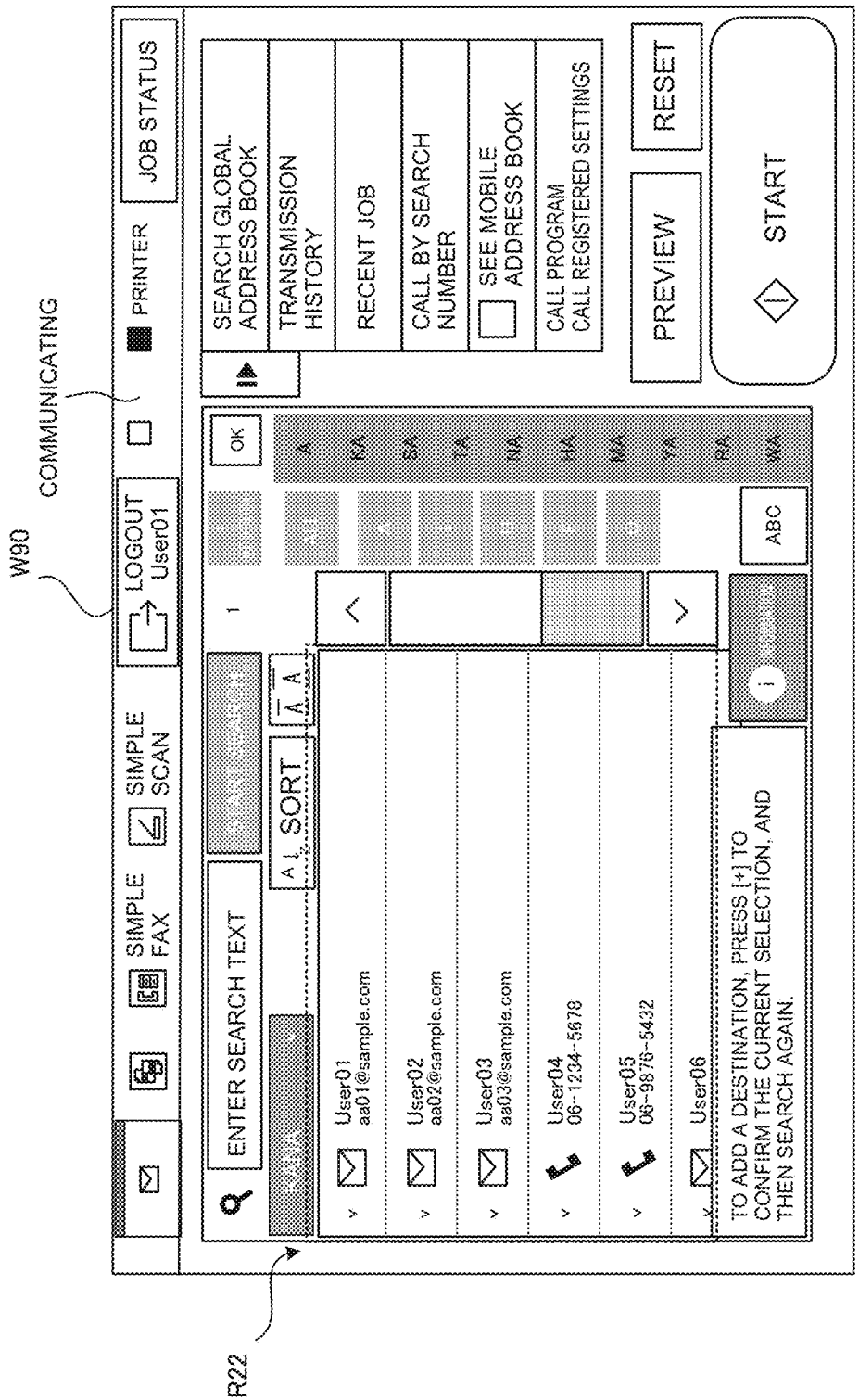
FIG. 15 is a view illustrating an operation example of the first embodiment.

FIG. 15 illustrates an example form of an address book screen W90 that is displayed when both the "Filter by E-mail Address" and the "Filter by Fax Number" check boxes of the destination information filtering check box CB12 are checked in the setting screen W80.

In the example of FIG. 15, both the "Filter by E-mail Address" and the "Filter by Fax Number" check boxes of the destination information filtering check box CB12 are checked, so that both the e-mail addresses and the fax numbers of the acquired destination information are displayed in the filtered destination information display area R22 of the address book screen W90.

Figure 16:
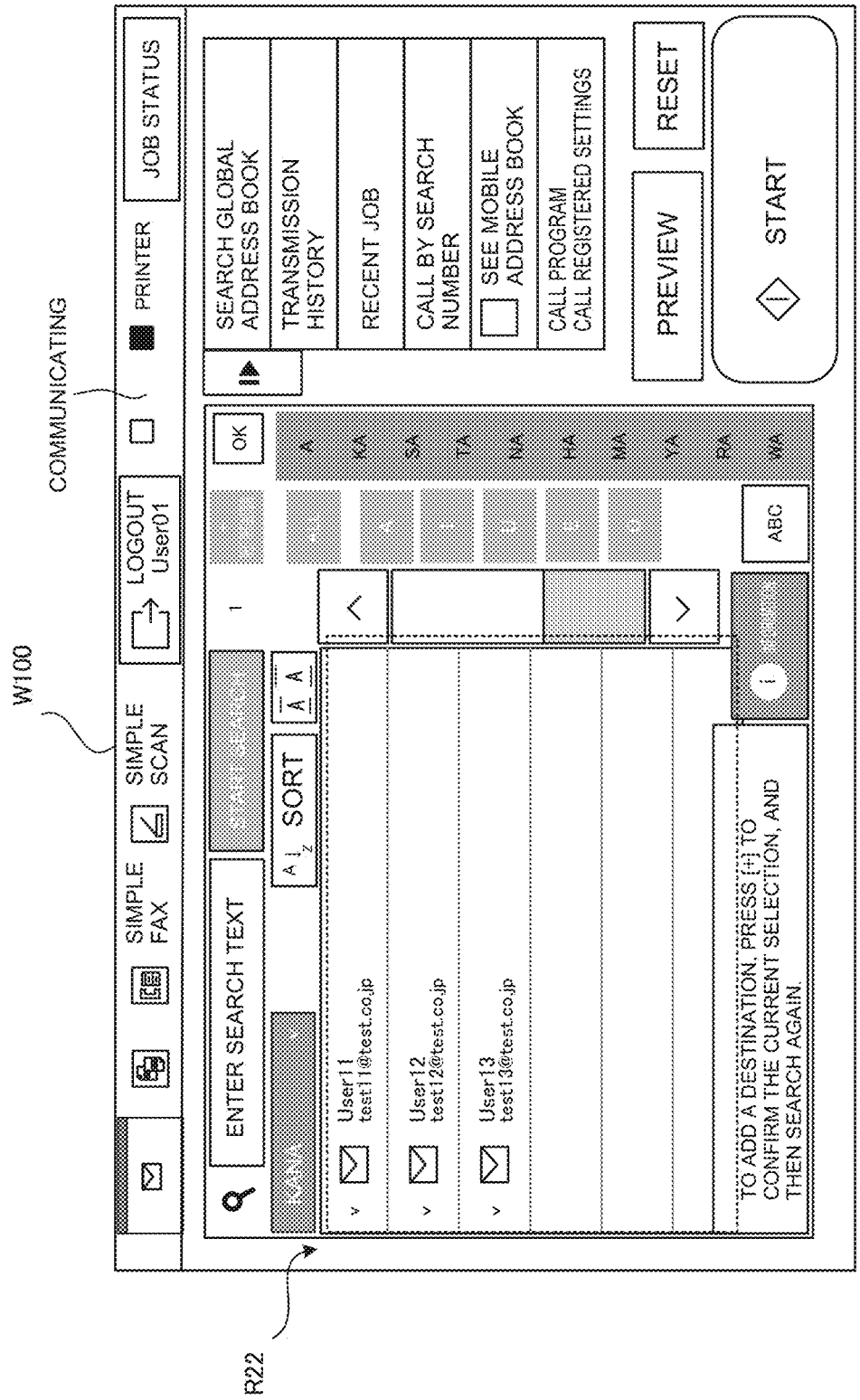
FIG. 16 is a view explaining an operation example of the first embodiment.

On the other hand, FIG. 16 illustrates an example of an address book screen W100 displayed when the check box of the "Filter by E-mail Address" of the destination information filtering check box CB12 of the setting screen W80 is checked.

In the example of FIG. 16, the "Filter by E-mail Address" of the destination information filtering check box CB12 is checked in the destination information filtering check box CB12, so that the e-mail addresses of the acquired destination information are displayed in the filtered destination information display area R22 of the address book screen W100.

In the priority display of the address book acquired from the external device when the destination information is acquired via the home screen, the transmission mode to be moved to may be a simple setting mode (screen) such as simple scan or simple fax, or a normal image transmission mode (basic image transmission screen), or other modes described below are also possible:

(1) When the address book acquired from the external device only includes e-mail addresses or fax numbers, the mode is shifted to the simple setting mode such as the simple scan or the simple fax. When the address book acquired from the external device includes both e-mail addresses and fax numbers, the mode is shifted to the normal image transmission mode.

(2) The transmission mode to be shifted to is set in advance in the system settings, and the mode is shifted to the transmission mode in accordance with the settings.

(3) The transmission mode to be shifted is set in advance in the system settings for each user, and the system shifts to the transmission mode according to the settings.

(4) The mode is shifted to the transmission mode in accordance with a history setting of the address book acquired from the external device when the address book is used in the past. (In a case of using user authentication, the history setting of the logged-in user is used, otherwise the latest history setting is used.)

1.3.3 Collective Display of Forwarded Destination Information

The multifunction peripheral 10 according to the first embodiment can also display a list of forwarded destination information and perform sending thereto directly.

Figure 17:
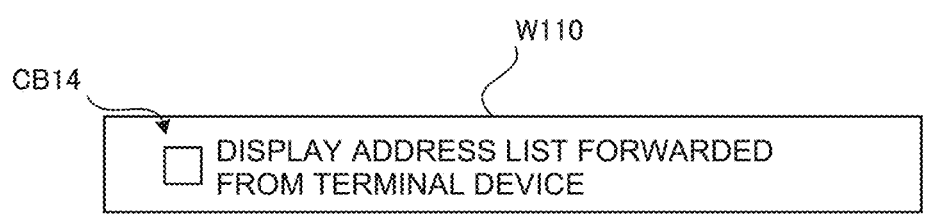
FIG. 17 is a view explaining an operation example of the first embodiment.

FIG. 17 illustrates an example of a list view setting screen W110. The user can display the list of destination information after acquiring it by checking a list view selection check box CB14 provided in the list view setting screen W110. The list view setting screen W110 can be displayed by adding an input item for accepting the input to display the list view setting screen W110 in, for example, the system information screen described in FIG. 7.

Figure 18:
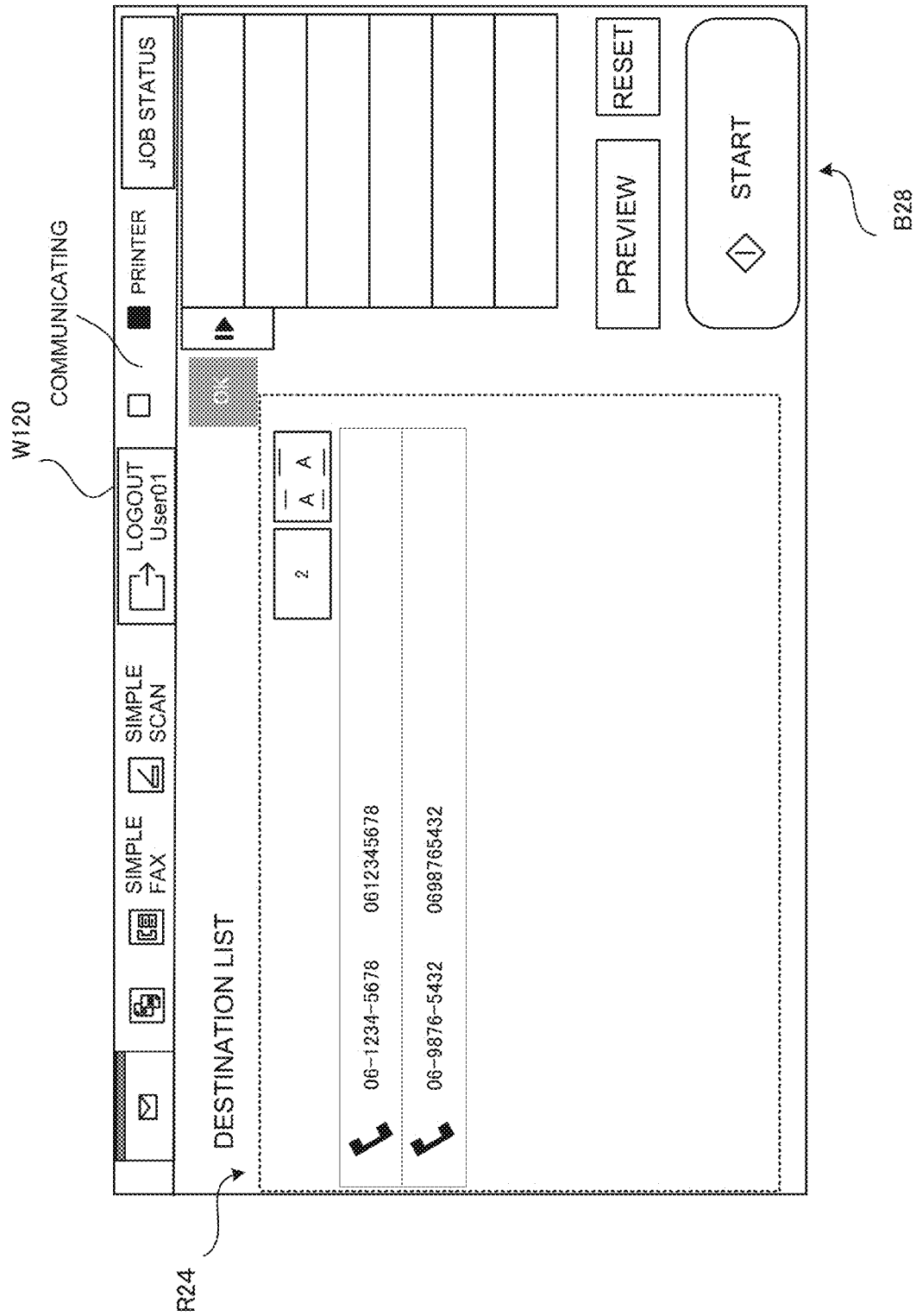
FIG. 18 is a view explaining an operation example of the first embodiment.

FIG. 18 illustrates an example of a destination information list screen W120 displayed when the list view selection check box CB14 is checked. The destination information list screen W120 includes a destination information list display area R24 in which the list of acquired destination information is displayed and a transmission confirmation button B28.

The destination information list display area R24 is an area for displaying a list of the acquired destination information. In addition, the destination information list display area R24 accepts the selection of the destination as the destination of the image data.

The transmission confirmation button B28 accepts the confirmation of transmission of the image data to the destination selected in the destination information list display area R24. The user can transmit the image data or the like to the destination indicated by the destination information displayed in the destination information list display area R24 by pressing the transmission confirmation button B28. It is also possible to select a desired destination from the destination information displayed in the destination information list display area R24 before pressing the transmission confirmation button B28. In that case, various settings such as a color mode, a resolution, and the like shall be subject to default values of the system settings, but it is also possible to change the setting information by providing, for example, the setting information display area R18 illustrated in FIG. 12 in the destination information list screen W120.

1.3.4 Priority Display of Destination Information in Accordance with Job Execution History The multifunction peripheral 10 according to the first embodiment can also provide a priority display of the destination information in accordance with the job execution history. For example, in an address book screen W130 illustrated in FIG. 19, assume that the destination "test13@test.co.jp" indicated in the dotted frame is selected and the image data or the like has been transmitted to this destination.

Figure 20:
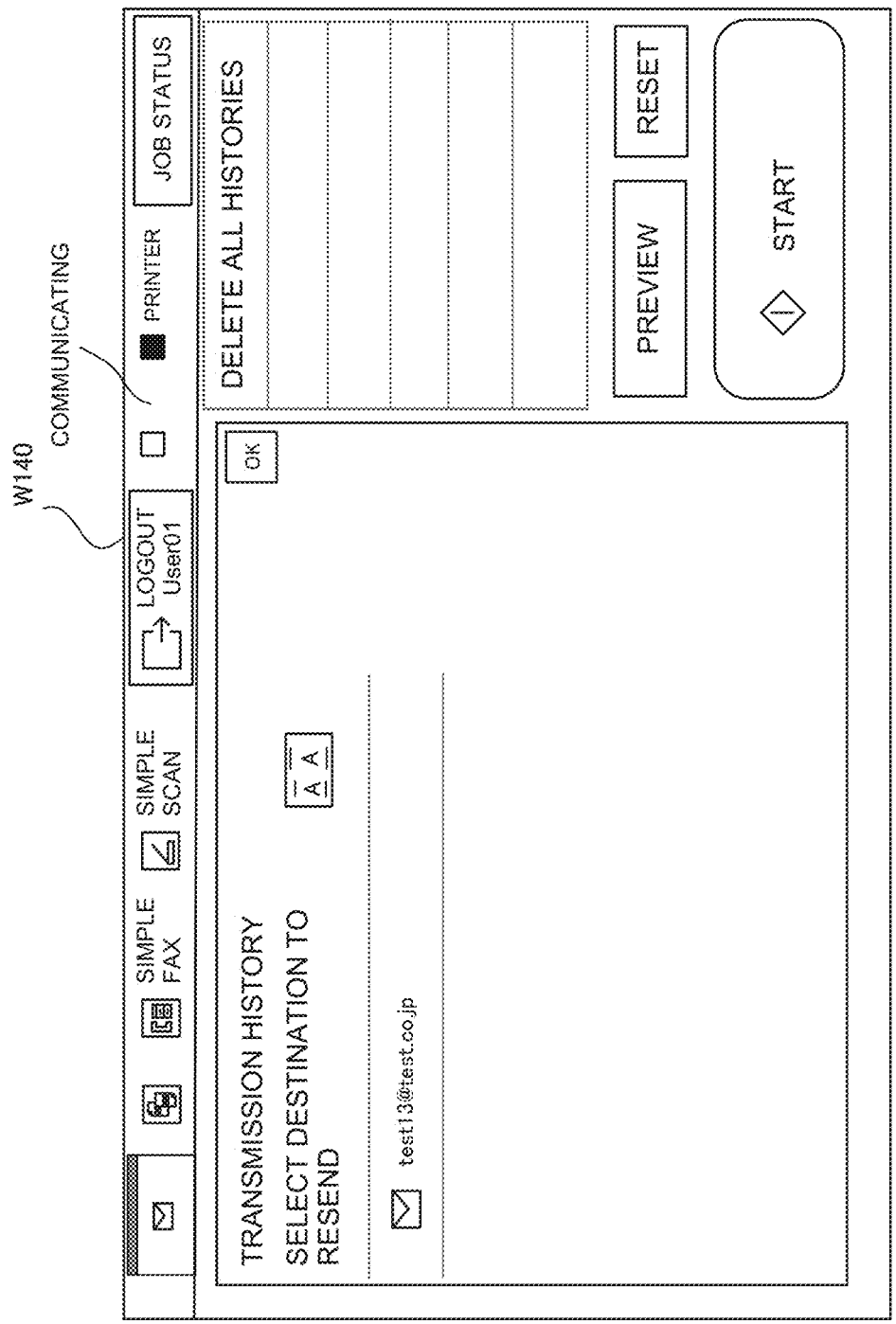
FIG. 20 is a view explaining an operation example of the first embodiment.

After a specific destination is selected in accordance with the destination information acquired from the terminal device 30, and the image data or the like is transmitted to this destination, then the transmission information is recorded as a transmission history, as illustrated in a transmission history screen W140 in FIG. 20.

Figure 21:
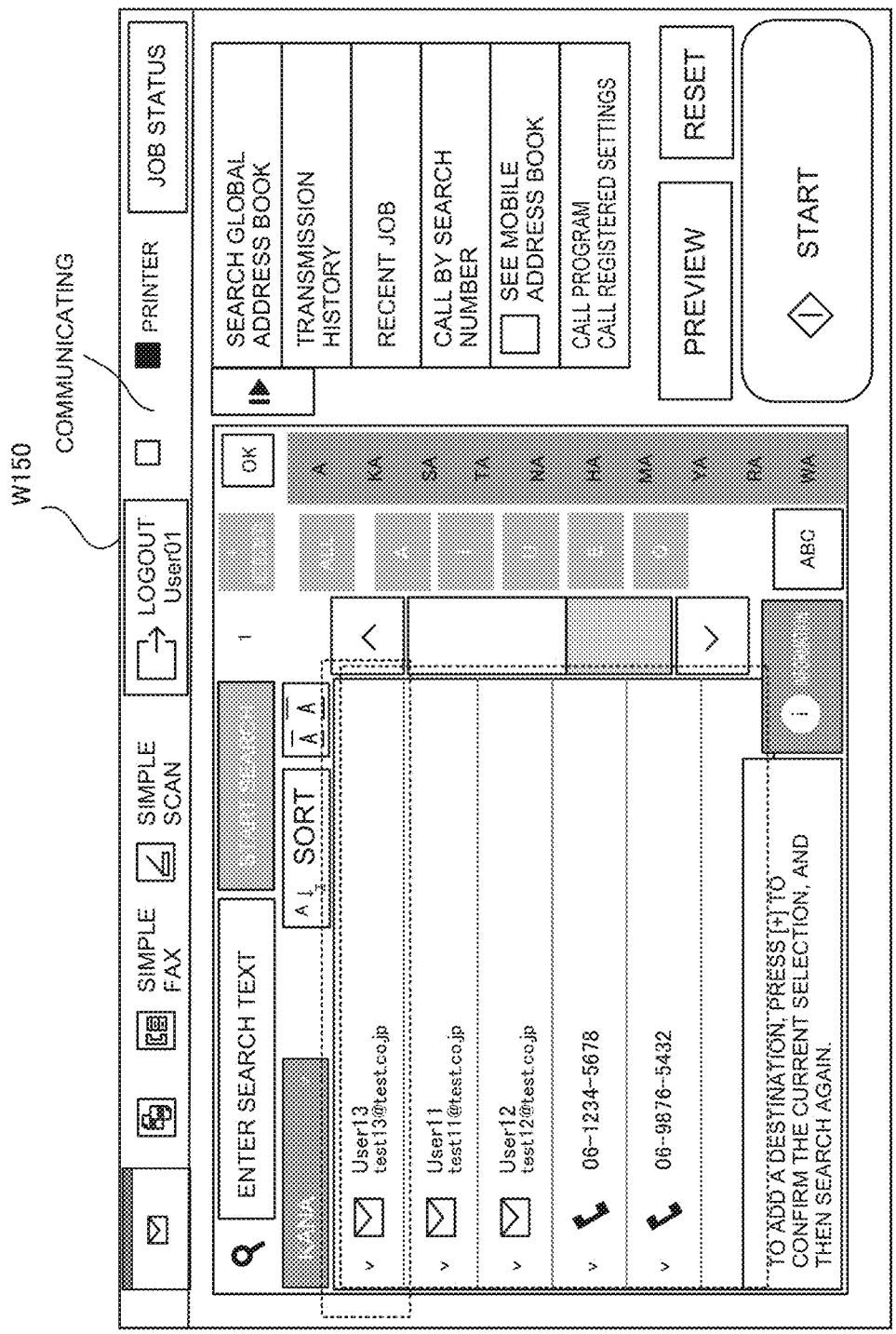
FIG. 21 is a view explaining an operation example of the first embodiment.

The next time the destination information is acquired, the controller 11 refers to the recorded transmission history. Then, the controller 11 preferentially displays the destination information "test13@test.co.jp" that matches the destination information recorded as the transmission history at the top of the destination information in an address book screen W150 illustrated in FIG. 21.

As described above, the first embodiment can provide the information processing device and the like that can easily acquire the destination information from the external terminal device without installing a dedicated application, and increase convenience of sending e-mails and faxes.

2. Second Embodiment

A multifunction peripheral according to a second embodiment includes an imager such as a camera to capture an image of the destination information managed by the terminal device. When the multifunction peripheral acquires the destination information that matches the captured image of the destination information, the multifunction peripheral preferentially displays this destination information.

2.1 Functional Configuration

Figure 22:
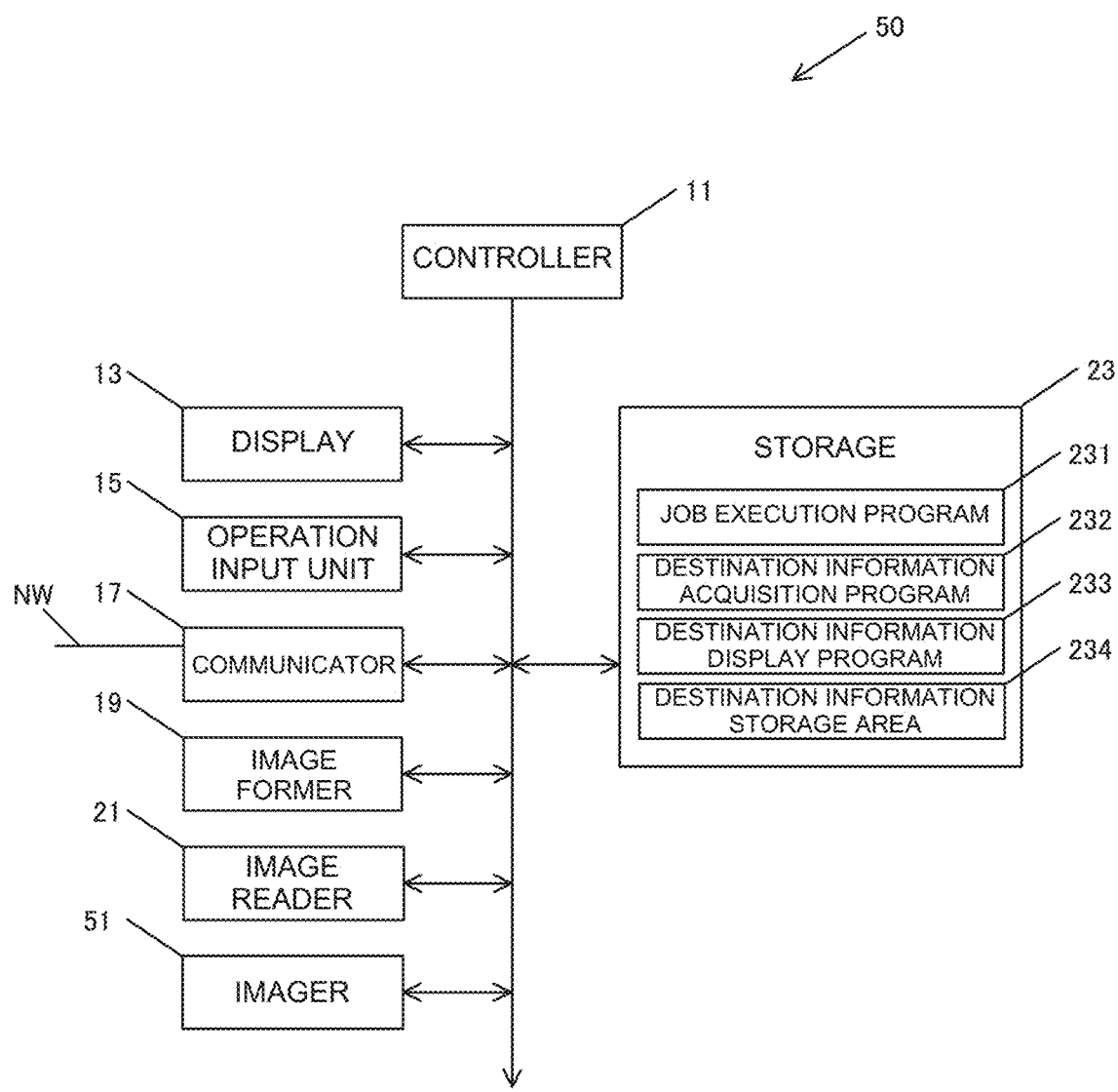
FIG. 22 illustrates a functional configuration of an information processing device according to a second embodiment.

FIG. 22 is a functional configuration diagram explaining a functional configuration of a multifunction peripheral 50 according to the second embodiment. The same reference signs may be assigned to the components identical to those in the multifunction peripheral 10 according to the first embodiment, and the explanation thereof may be omitted.

The multifunction peripheral 50 includes the controller 11, the display 13, the operation input unit 15, the communicator 17, the image former 19, the image reader 21, an imager 51, and the storage 23.

The imager 51 captures the image of the destination information such as a telephone number, an e-mail address, a fax number, an account, and the like displayed on the display 33 of the terminal device 30 (hereinafter referred to as the displayed destination information). The imager 51 outputs the image information acquired by capturing the image to the controller 11.

2.2 Processing Flow

Figure 23:
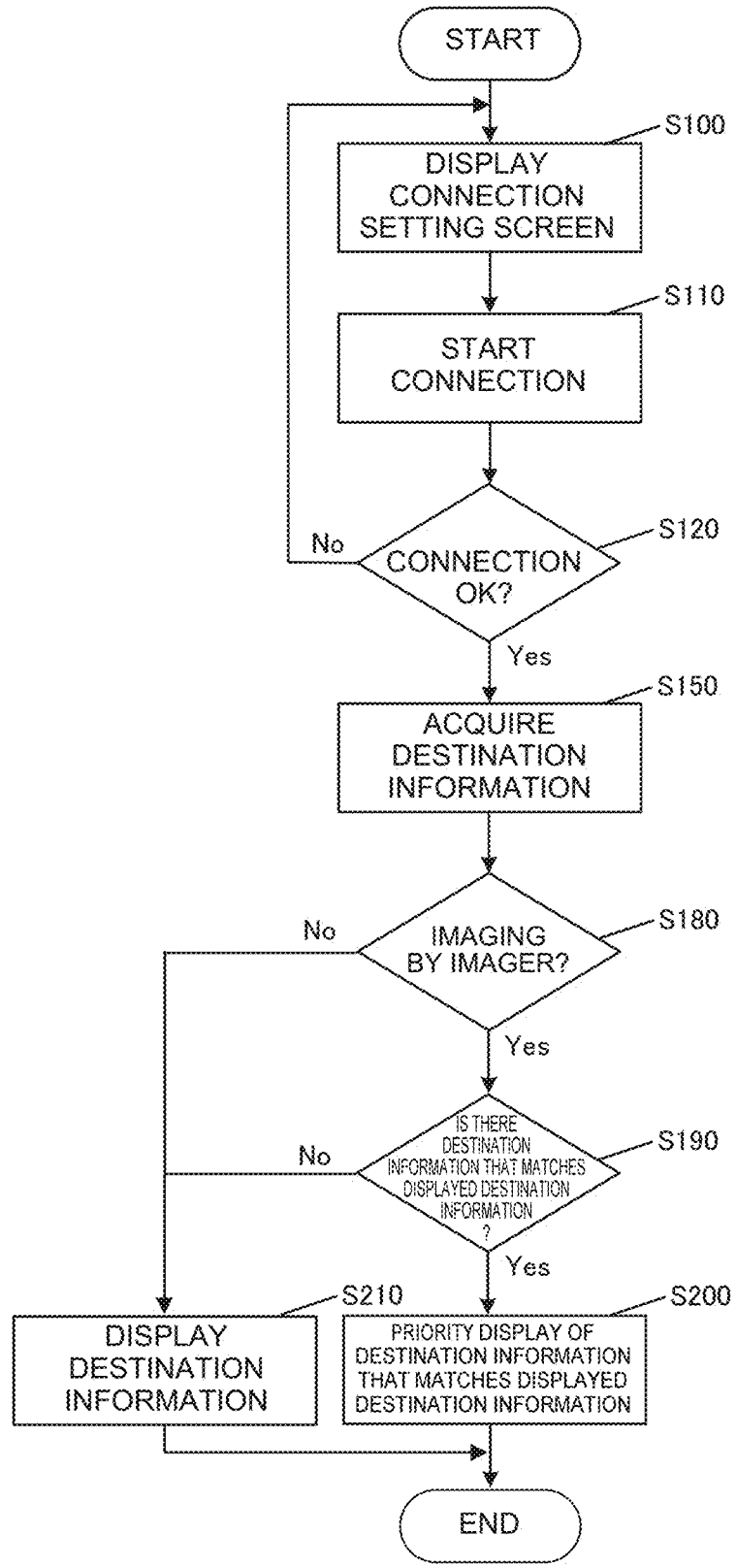
FIG. 23 is a flowchart explaining a processing flow according to the second embodiment.

Next, a processing flow according to the second embodiment is described by referring to FIG. 23. The process from step S100 to step S120 is identical to the process described in FIG. 5, so that its explanation is omitted here.

If the connection with the terminal device 30 is successful (step S120; Yes), the controller 11 acquires the destination information from the terminal device 30 (step S150).

Subsequently, the controller 11 checks whether the displayed destination information displayed on the terminal device 30 has been captured by the imager 51 (step S180). If the displayed destination information is captured (step S180; Yes), the controller 11 acquires the displayed destination information from the image information acquired from the imager 51.

The controller 11 determines whether there is any matching destination information between the destination information acquired in step S150 and the displayed destination information acquired from the imager 51 (step S190).

If the determination result indicates that there is the destination information that matches the displayed destination information (step S190; Yes), the controller 11 displays this destination information preferentially (step S200) and ends the process.

On the other hand, if the displayed destination information is not captured by the imager 51 (step S180; No), or there is no destination information matching the displayed destination information (step S190; No), the controller 11 displays the destination information acquired in step S150 (step S210) and ends the process.

After executing the job, the controller 11 deletes the destination information displayed in step S200 or step S210 from the destination information storage area 234.

2.3 Operation Example

Figure 24:
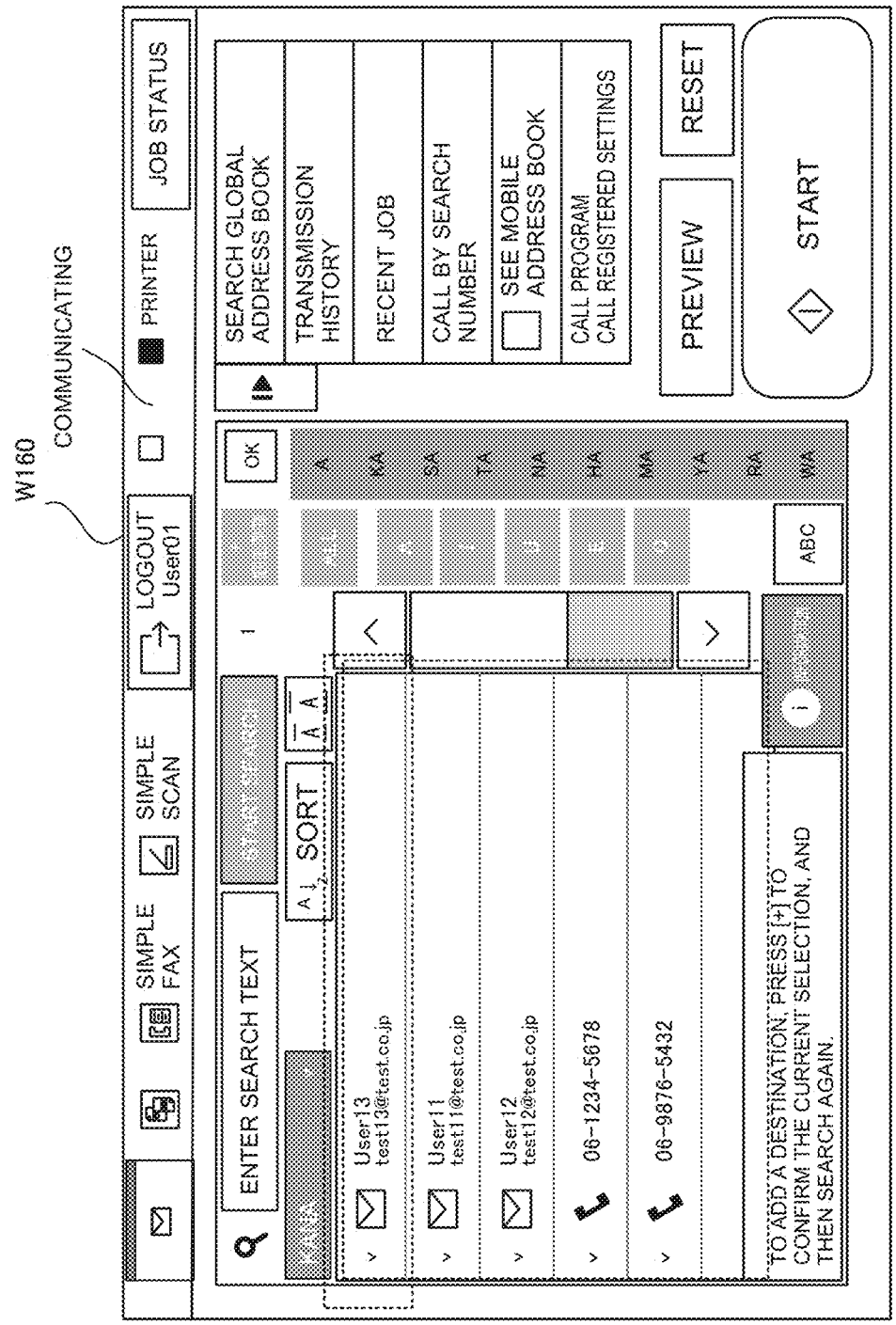
FIG. 24 is a view explaining an operation example according to the second embodiment.

FIG. 24 illustrates an example of an address book screen W160 displayed by the controller 11 when there is the destination information that matches the displayed destination information among the acquired destination information.

Figure 19:
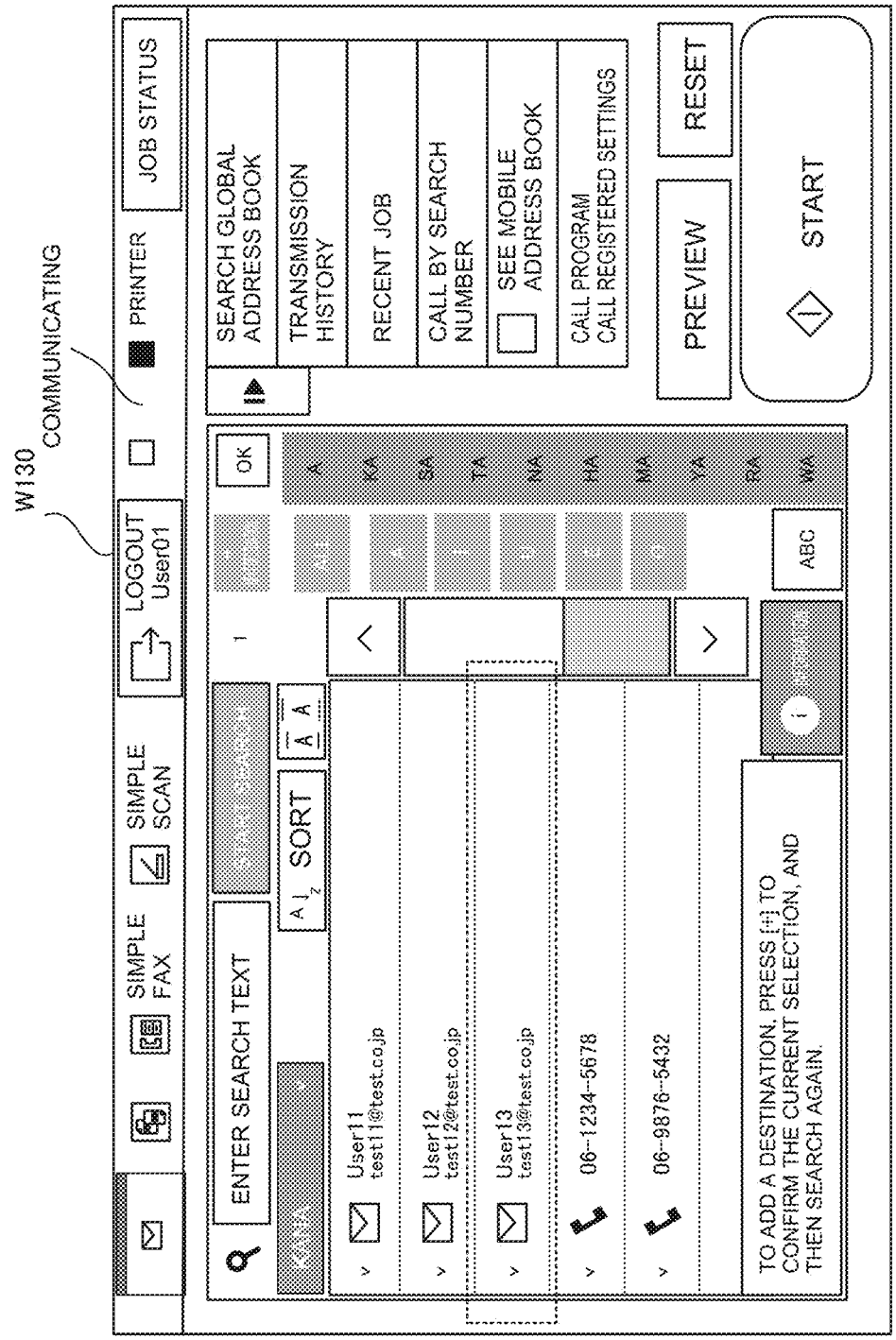
FIG. 19 is a view explaining an operation example of the first embodiment.

For example, assume that the controller 11 has acquired, in step S150 of FIG. 23, the destination information "test11@test.co.jp", "test12@test.co.jp", "test13@test.co.jp", "06-1234-5678", and "06-9876-5432" (see FIG. 19). Here, if the displayed destination information acquired via the imager 51 in step S180 of FIG. 23 is "test13@test.co.jp", the controller 11 preferentially displays the matching destination information "test13@test.co.jp" as the displayed destination information at the top of the destination information, as indicated in the dotted frame in FIG. 24.

As described above, in addition to the effects associated with the first embodiment, the second embodiment can preferentially display the destination information acquired by the imager when the destination information matches the destination information acquired by forwarding. Therefore, the second embodiment can reflect the priority level of the destination information in the terminal device 30 in displaying the destination information forwarded.

3. Third Embodiment

A multifunction peripheral according to a third embodiment includes a destination information identification program that identifies frequently used destination information in the terminal device. The multifunction peripheral preferentially displays the destination information, when acquired, that matches the frequently used destination information in the terminal device.

3.1 Functional Configuration

Figure 25:
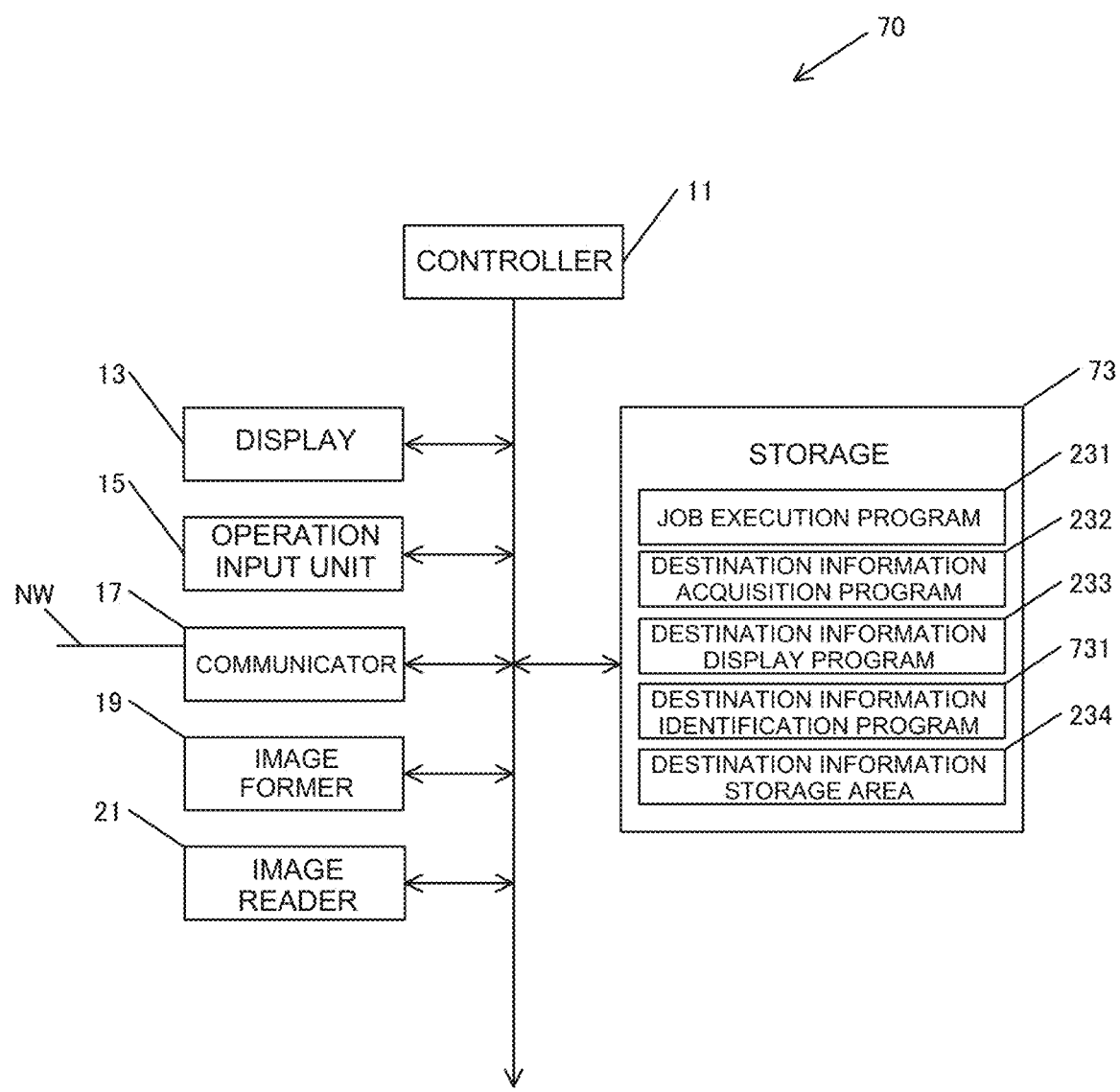
FIG. 25 illustrates a functional configuration of an information processing device according to a third embodiment.

FIG. 25 is a functional configuration diagram explaining a functional configuration of a multifunction peripheral 70 according to a third embodiment. The same reference signs may be assigned to the components identical to those in the multifunction peripheral 10 according to the first embodiment, and the explanation thereof may be omitted.

The multifunction peripheral 70 includes a storage 73 instead of the storage 23 of the first embodiment. In the third embodiment, the storage 73 includes the job execution program 231, the destination information acquisition program 232, the destination information display program 233, and a destination information identification program 731, and includes the destination information storage area 234.

The destination information identification program 731 is a program read by the controller 11 in identifying frequently used destination information in the terminal device 30. The controller 11 identifies the destination information that is frequently selected as the destination when, for example, a phone call application, an e-mail application, a fax application, a messaging application, or an SNS application such as a chat application is used in the terminal device 30. In that case, the controller 11 may, for example, acquire the information about the frequency of use of the destination information from the image information acquired via the imager 51 according to the second embodiment, or through communication via the communicator 17.

3.2 Processing Flow

Figure 26:
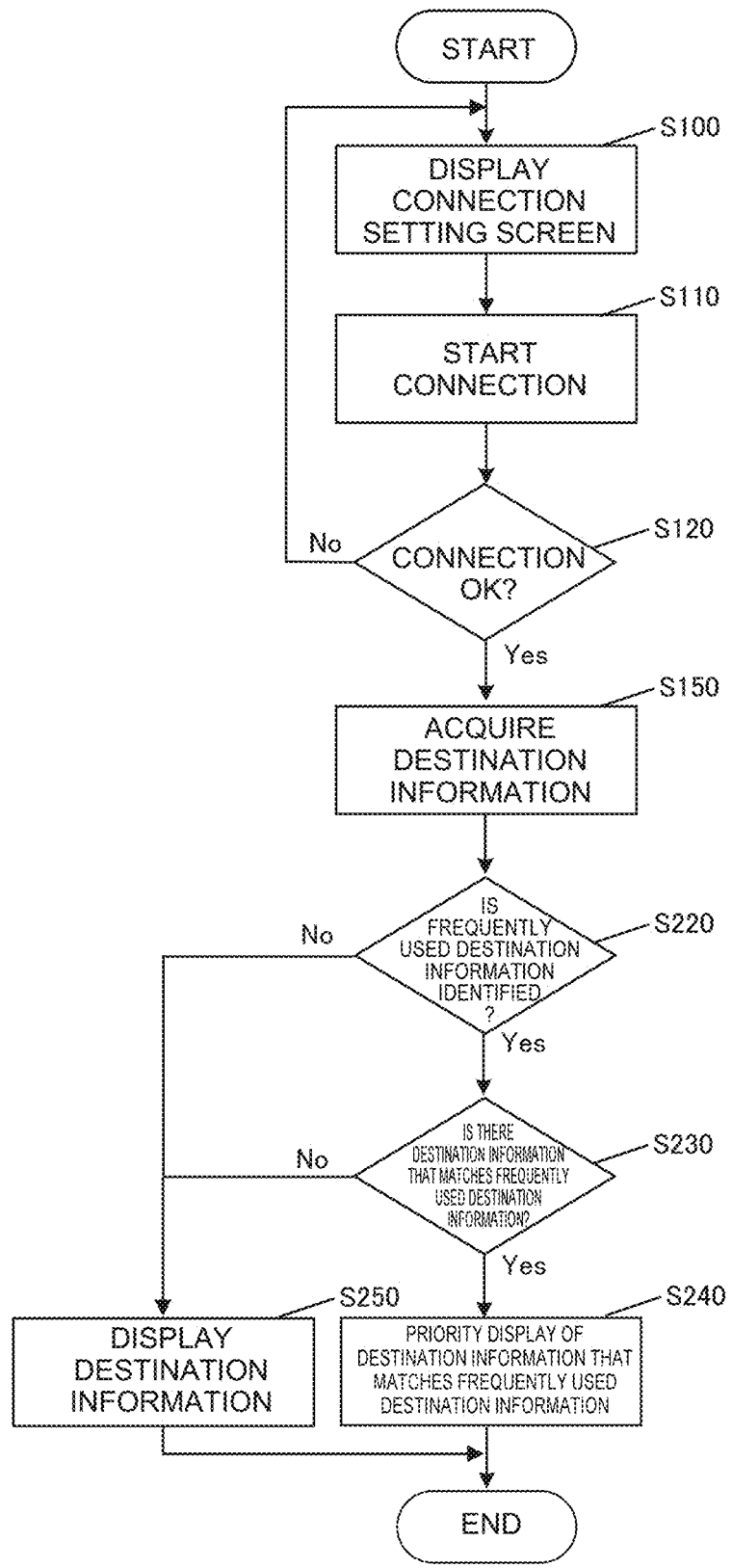
FIG. 26 is a flowchart explaining a processing flow according to the third embodiment.

Next, a processing flow according to the third embodiment is described by referring to FIG. 26. The process from step S100 to step S150 is identical to the process described in FIG. 23, so that its explanation is omitted here.

After acquiring the destination information from the terminal device 30 (step S150), the controller 11 identifies the destination information that is frequently used in the terminal device 30 (step S220).

When the frequently used destination information is identified (step S220; Yes), the controller 11 determines whether there is any matching destination information between the destination information acquired in step S150 and the identified destination information (step S230).

If the determination result indicates that there is the destination information that matches the frequently used destination information (step S230; Yes), the controller 11 preferentially displays that destination information (step S240) and ends the process.

On the other hand, if the frequently used destination information is not identified (step S220; No), or there is no destination information matching the frequently used destination information (step S230; No), the controller 11 displays the destination information acquired in step S150 (step S250) and ends the process.

After executing the job, the controller 11 deletes the destination information displayed in step S240 or step S250 from the destination information storage area 234.

3.3 Operation Example

Figure 27:
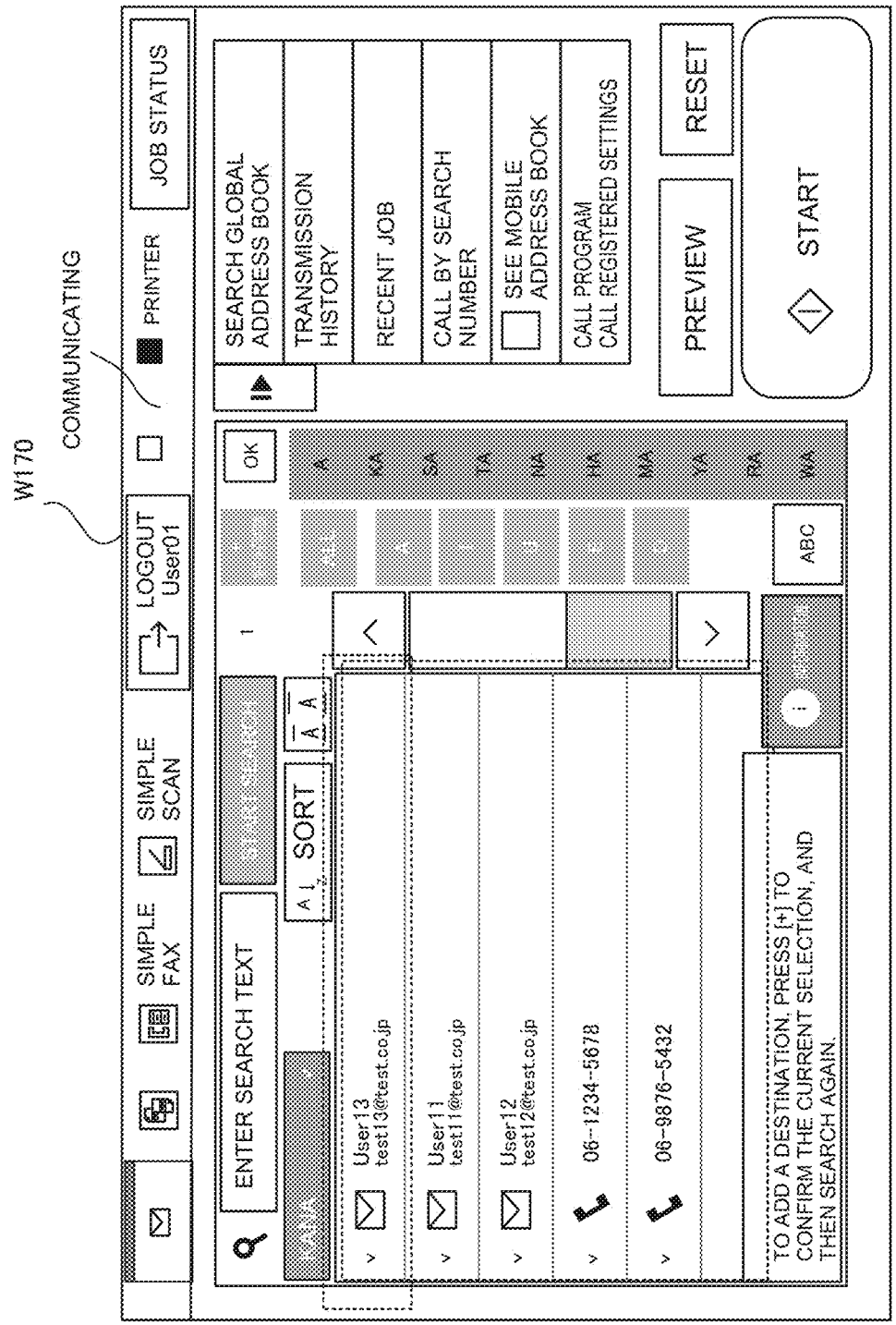
FIG. 27 is a view explaining an operation example of the third embodiment.

FIG. 27 illustrates an example of an address book screen W170 displayed by the controller 11 when there is the destination information that matches the frequently used destination information among the acquired destination information.

For example, in step S150 of FIG. 26, assume that the controller 11 has acquired the destination information "test11@test.co.jp", "test12@test.co.jp", "test13@test.co.jp", "06-1234-5678", and "06-9876-5432" (see FIG. 19). Here, if the frequently used destination information identified in step S220 of FIG. 26 is "test13@test.co.jp", the controller 11 preferentially displays the matching destination information "test13@test.co.jp" as the destination information at the top of the destination information, as indicated by a dotted frame in FIG. 27.

When identifying the frequently used destination information in the terminal device 30, the duration of interactions with a recipient (destination) (for example, within last 30 days, from month aa, day bb of 2021 to month cc, day dd of 2021, or the like) or the applications used for interactions may be limited.

It may also be possible to specifically limit the number of times the interaction has been made with the recipient. For example, if there are three or more interactions with a particular recipient, the destination information pertaining to the destination of the recipient is identified as the target for priority display. If the interaction is carried out less than three times, the destination information is not identified as the target for priority display even if there are interactions with the recipient. The number of times of the interactions with the recipient is only an example, and can be changed as needed depending on the settings.

As described above, according to the third embodiment, in addition to the effects associated with the first embodiment, the destination information that is frequently used in the terminal device and matches the destination information acquired from the terminal device can be preferentially displayed. Therefore, according to the third embodiment, the priority level of the destination information in the terminal device 30 can be reflected in displaying the destination information acquired from the terminal device.

The present invention is not limited to the above-described embodiments, and various modifications can be made. That is, the techniques that have been appropriately changed without departing from the gist of the present invention and combined to implement the present invention are also included in the technical scope of the present invention.

Although some of the above-described embodiments are described separately for convenience of explanation, it is needless to say that combining and implementing the embodiments within a technically allowable range is also possible.

Further, the program to be operated on the individual devices of the embodiments is a program which controls the CPU or the like (program which makes a computer work) so as to implement the functions of the above-described embodiments. The information handled by these devices is temporarily stored in a temporary storage device (for example, a RAM) during the processing of the information. The information is then stored in various storage devices such as a read only memory (ROM), a HDD, or the like, and is read, corrected, and written by the CPU as needed.

Here, a storage medium for storing the program may be any one of a semiconductor medium (for example, a ROM or a non-volatile memory card), an optical storage medium/ magneto-optical storage medium (for example, a digital versatile disc (DVD), a magneto optical disc (MO), a mini disc (MD), a compact disc (CD), a Blue-ray disc (BD) (registered trademark), and a magnetic storage medium (for example, a magnetic tape, a flexible disk, or the like). In addition to implement the functions of the above-described embodiments by execution of the loaded program, the functions of the present invention may be implemented in accordance with the instructions of the program by performing the processing in cooperation with an operating system or other application programs or the like.

When it is desired to distribute the program in the market, the program may be stored in a portable recording medium for distribution, or transferred to a server computer connected via a network such as the Internet. In that case, a storage device of the server computer is also included in the present invention as a matter of course.

What is claimed is:

1. An information processing device, comprising:
a display;
a communicator; and
one or more controllers, wherein
the one or more controllers:
collectively acquire, via the communicator, all of destination information that is managed by a terminal device, the destination information comprising a plurality of types of destination, each type of destination comprising one or more destination items of a same type,
determine priority levels of the plurality of types of destination in accordance with a number of destination items in a corresponding type of destination in the plurality of types of destination included in the acquired destination information, and
display the acquired destination information on the display according to the priority levels.

2. The information processing device according to claim 1, wherein
the one or more controllers execute a job that uses the acquired destination information.

3. The information processing device according to claim 2, wherein
the one or more controllers determine a priority level for a type of destination based on a type of the job associated with the type of destination after acquiring the destination information.

4. The information processing device according to claim 2, wherein
the one or more controllers determine a priority level for a type of destination associated with the job based on an execution history of the job.

5. The information processing device according to claim 1, wherein
the one or more controllers identify a type of destination in the plurality of types of destination based on a job type selected by a user for a corresponding destination.

6. The information processing device according to claim 5, wherein the one or more controllers identify the plurality of types of destination on a basis of a character contained in a corresponding destination item.

7. The information processing device according to claim 1, wherein
the one or more controllers display, on the display, a setting screen of a job pertaining to the destination information for which the priority levels has been determined.

8. The information processing device according to claim 1, further comprising:
an imager that captures an image of destination information displayed on the terminal device, wherein
the one or more controllers determine the priority levels further in accordance with the image.

9. The information processing device according to claim 1, wherein
the one or more controllers determine the priority levels in accordance with a frequency of usage of the destination information on the terminal device.

10. The information processing device according to claim 1, wherein
the one or more controllers display, on the display, the acquired destination information as a list, and accepts an instruction for executing a job selected from the list.

11. The image processing device according to claim 1, wherein:
the plurality of types of destination in the destination information includes at least two types of destination; and
the one or more controllers:

compare the number of destination items in each of the at least two types of destination against each other, determine a higher priority level to a type of destination, in which the number of destination items is larger based on the comparison, and display, on the display, destination items of each of the at least two types of destination in a descending order of the priority levels of the at least two types of destination.

12. An image forming apparatus, comprising:

an information processing device including a display, a communicator, and one or more controllers; and an image former that forms an image on a recording medium based on input image data, wherein the one or more controllers:

collectively acquire, via the communicator, all of destination information that is managed by a terminal device, the destination information comprising a plurality of types of destination, each type of destination comprising one or more destination items of a same type, determine priority levels of the plurality of types of destination in accordance with a number of destination items in a corresponding type of destination in the plurality of types of the destination included in the acquired destination information, and display the acquired destination information on the display in accordance with the priority levels.

13. An information processing method, comprising:

establishing communication between an information processing device and a terminal device;

collectively acquiring all of destination information that is managed by the terminal device the destination information comprising a plurality of types of destination, each type of destination comprising one or more destination items of a same type;

determining priority levels of the plurality of types of destination in accordance with a number of destination items in a corresponding type of destination in the plurality of types of destination included in the acquired destination information; and displaying the acquired destination information on a display device in accordance with the priority levels.

* * * * *